United States Patent
Ebrahimifard et al.

(10) Patent No.: US 11,694,673 B2
(45) Date of Patent: Jul. 4, 2023

(54) SYSTEM AND METHOD FOR AUTOMATED COMMUNICATION WITH AIR TRAFFIC CONTROL

(71) Applicant: The Boeing Company, Chicago, IL (US)

(72) Inventors: Badi Ebrahimifard, Seattle, WA (US); Rohan S. Sharma, Mountlake Terrace, WA (US); Jesse G. Francheshini, Seattle, WA (US); Fuzhou Hu, Bothell, WA (US)

(73) Assignee: The Boeing Company, Chicago, IL (US)

( * ) Notice: Subject to any disclaimer, the term of this patent is extended or adjusted under 35 U.S.C. 154(b) by 374 days.

(21) Appl. No.: 16/710,654

(22) Filed: Dec. 11, 2019

(65) Prior Publication Data

US 2021/0183360 A1    Jun. 17, 2021

(51) Int. Cl.
*G10L 13/08*  (2013.01)
*G08G 5/00*   (2006.01)
*G10L 13/00*  (2006.01)

(52) U.S. Cl.
CPC .............. *G10L 13/08* (2013.01); *G08G 5/003* (2013.01); *G08G 5/0013* (2013.01); *G10L 13/00* (2013.01)

(58) Field of Classification Search
CPC ....... G10L 13/08; G10L 13/00; G08G 5/0013; G08G 5/003
See application file for complete search history.

(56) References Cited

U.S. PATENT DOCUMENTS

| | | | |
|---|---|---|---|
| 7,774,202 B2 * | 8/2010 | Spengler | G10L 15/22 704/236 |
| 9,824,689 B1 * | 11/2017 | Shapiro | G10L 15/22 |
| 2008/0201148 A1 * | 8/2008 | Desrochers | 704/257 |
| 2012/0158211 A1 * | 6/2012 | Chen | G06Q 10/08 701/1 |
| 2018/0268718 A1 * | 9/2018 | Srivastav | G10L 15/26 |

* cited by examiner

*Primary Examiner* — Pierre Louis Desir
*Assistant Examiner* — Nicole A K Schmieder
(74) *Attorney, Agent, or Firm* — Kwan & Olynick LLP

(57) ABSTRACT

Systems and methods for automated communication with Air Traffic Control. The system comprises a processor and memory. The memory stores instructions to execute a method. The method includes receiving audio communication input from an air traffic controller (ATC). The audio communication input is then converted into text input. Next, an aircraft keyword is detected in the text input. The text input is then parsed and one or more data structures are generated from the parsed input. In some examples, the one or more data structures includes command data for controlling the aircraft. Next, the command data in the one or more data structures is verified. The one or more data structures are then transmitted to an onboard flight computer of the aircraft. Last, the one or more data structures are stored in a conversation memory.

20 Claims, 35 Drawing Sheets

```
let builder = new ATCBuilder();
```

```
let builder = new ATCBuilder();

builder.Taxi();
```

```
let builder = new ATCBuilder();

builder.Taxi();

builder.To(
    Runway(35, "left")
).End();

builder.Build();
```

```
let builder = new ATCBuilder();

builder.Taxi();

builder.To(
    Runway(35, "left")
);

builder.End();

builder.HoldShort();

builder.Of(
    Taxiway("A")
);

builder.End();

builder.Build();
```

```
let builder = new ATCBuilder();

builder
    .Taxi();
        .To(
            Runway(35, "left")
        )
    .End();
    .HoldShort();
        .Of(
            Taxiway("A")
        )
    .End();
.Build();
```

*FIG. 12A*

BaseAction

```
import { BaseEntity } from '../BaseEntity';
import { IValidation } from '../Utils/IValidation';
import { Validation } from '../Utils/Validation';

export abstract class BaseAction extends BaseEntity {
  //#region Constructors constructor() {
    super();
  }

//#endregion
}
```

*FIG. 13*

ChangeAltitude

```
import { Altitude } from '../Distance/Altitude';
import { Heading } from '../Orientation/Heading';
import { BaseAction } from '../BaseAction';

export abstract class ChangeAltitude extends BaseAction {
  protected heading: Heading | null;
  protected altitude: Altitude | null;
  protected through: Altitude | null;

constructor(altitude?: Altitude, heading?: Heading, through?: Altitude) {
     super();
     this.altitude = altitude || null;
     this.heading = heading || null;
     this.through = through || null;
  } public getAltitude():Altitude || null {
     return this.altitude;
  }
  public setAltitude(altitude: Altitude): void {
     this.altitude = altitude;
  } public getHeading(): Heading | void {
     return this.heading;
  }
  public setHeading(heading: Heading): void {
     this.heading = heading;
```

FIG. 14

BaseBuilder

```
import { IValidable } from '../Models/Utils/IValidable';

/**
 * BaseBuilder
 * Provides minimal methods necessary for building an object
that implements IValidable
 */
export abstract class BaseBuilder<T extends IValidable> {
  /**
   * @property The object being built.
   */
  protected beingBuilt!: T;

/**
   * End
   * Runs validation on the object being built and returns it.
   * @returns An object of type T
   */
  public end(): T {
    this.validate();
    return this.beingBuilt;
  }

/**
   * Validate
   * Calls the validation method attached to the object being built.
   */
  public validate(){
    this.beingBuilt.validate();
  }
}
```

*FIG. 15*

ActionBuilder

```
import { ATCCommand } from '../ATCCommand';
import { BaseAction } from '../Models/Actions/BaseAction';
import { ATCBuilder } from '../ATCBuilder';
import { IActionBuilder } from '../IActionBuilder';

export class ActionBuilder<T extends BaseAction> implements
IActionBuilder {
  private action!: T;
  private parentBuilder: ATCBuilder;

constructor(parentBuilder: ATCBuilder){
    this.parentBuilder = parentBuilder;
  } public Build(): ATCCommand {
    return this.End().Build();
  } public setAction(action: T): void {
    this.action = action;
  } public getAction(): T {
    return this.action;
  } public End(): ATCBuilder {
    return this.parentBuilder.Save(this.action);
  }
}
```

*FIG. 16*

ATCBuilder

```
import { ATCCommand } from '../ATCCommand';
import { BaseAction } from '../Models/Actions/BaseAction';
import { ActionBuilder } from '../ActionBuilder';
import { FollowBuilder } from '../FollowBuilder';
import { HoldShortBuilder } from '../HoldShortBuilder';
import { TakeoffBuilder } from '../TakeoffBuilder';
import { TaxiBuilder } from '../TaxiBuilder';

/**
 * @category ATC Builder
 */
export class ATCBuilder {
  private beingBuilt!: ActionBuilder<BaseAction> | null;
  private atcCommand: ATCCommand;

constructor(){
    this.atcCommand = new ATCCommand();
  } public Follow(): FollowBuilder {
    this.Save();
    this.beingBuilt = new FollowBuilder(this);
    return this.beingBuild as FollowBuilder;
  } public HoldShort(): HoldShortBuilder {
    this.Save();
    this.beingBuilt = new HoldShortBuilder(this);
    return this.beingBuilt as HoldShortBuilder;
  } public Taxi(): TaxiBuilder {
    this.Save();
    this.beingBuilt = new TaxiBuilder(this);
    return this.beingBuilt as TaxiBuilder;
  }
```

FIG. 17A

```
public Build(): ATCCommand {
  this.Save();
  this.atcCommand.validate();
  return this.atcCommand;
} public Takeoff(): TakeoffBuilder {
  this.Save();
  this.beingBuilt = new TakeoffBuilder(this);
  return this.beingBuilt as TakeoffBuilder;
} public Save(action?: BaseAction) this {
  if (action) {
    this.atcCommand.addAction(action);
  } else if (this.beingBuilt != null) {
    this.atcCommand.addAction(this.beingBuilt.getAction());
  }
  this.beingBuilt = null;
  return this;
}

/**
 * Used to get the current command being built.
 * @returns {ATCCommand} - the command being built.
 */
public getCommand(): ATCCommand {
```

| ATC Datatypes | Display | Overview | Validation |
|---|---|---|---|
| Airplane | Represents an Airplane object. | This class represents an Airplane object in the ATC Library. Airplane requires either a company or tail number designation, respectively assigned to company and tail number properties in the class.<br><br>In addition, the class contains an identifier property which is calculated from the company and tail number properties. If tail number has a value, then that is used, otherwise the company value is used.<br><br>Since an airplane is an object capable of movement, it extends the BaseMoveable class, allowing it to be used as the leader attribute in Follow commands (airplanes can follow other airplanes). | In order for the Airplane class to be valid, it has to have values in either its company or tail number properties. If both are empty, then a validation error is generated. |
| Altitude | Represents an Altitude object. | An Altitude object must have a numerical value assigned to its altitude parameter, which represents the height of the altitude. | In order for the Altitude class to be valid, it must have a value in its altitude attribute. In addition, the altitude needs to be greater than 0. |
| ChangeAltitude | An abstract datatype representing a | This class represents a command from an ATC to change altitude. Changing | In order for the ChangeAltitude class to be valid, |

FIG. 23 (Continued)

|  | BaseAction to change the altitude. | altitude requires a final altitude to change to and, optionally, an intermediate altitude to change through and a heading to maintain once the change is complete.<br><br>This class is abstract, meaning that it cannot be directly created. However, two other classes inherit from it Climb and Descend. Since those both represent the concept of changing altitude, they re-use the methods from this class rather than duplicating them in their own implementations. | it has to have a final altitude. The final Altitude class must also pass its own validation. If there is an intermediate altitude, it must also pass its own validation. If there is a heading, it must also pass its own validation. |
|---|---|---|---|
| Climb | A datatype representing a ChangeAltitude action to climb to a new altitude and optionally change heading. | A datatype representing a ChangeAltitude action to climb to a new altitude and optionally change heading.<br><br>This class represents a command from an ATC to climb to a new altitude. Climbing requires a final altitude to climb to and, optionally, an intermediate altitude to climb through and a heading to maintain once the climb is complete. | This class re-uses the validation set up by its parent class, ChangeAltitude. |
| Descend | A datatype representing a ChangeAltitude action to descend to a new altitude | This class represents a command from an ATC to descend to a new altitude. Descending requires a final altitude to descend to and, optionally, an intermediate | This class re-uses the validation set up by its parent class, ChangeAltitude. |

FIG. 23 (Continued)

| | | | |
|---|---|---|---|
| | and optionally change heading. | altitude to descend through and a heading to maintain once the descent is complete. | |
| Follow | Represents an action to follow a BaseMoveable leader. | This class represents a command from an ATC to follow something that moves. Following requires a moveable leader to follow, assigned to the class's leader property. In this class, the leader must be of type BaseMoveable, meaning it must be an object capable of moving (and therefore being followed). | In order for the Follow class to be valid, it has to have a value in its leader property. The leader must be of type BaseMoveable and it must also pass its own validation. |
| Heading | Represents direction (in degrees). | This class represents an Heading object in the ATC Library. Heading requires heading attribute, which must be a number (degrees), which represents the direction of the Heading. | In order for the Heading class to be valid, it has to have a value in its heading property, and that value must be greater than or equal to zero (0) and less than 360. |
| HoldShort | Represents an action of holding short of a BaseArea threshold. | This class represents a command from an ATC for the aircraft to stop taxiing, either at its present location or at a defined location. HoldShort has an optional attribute of threshold which represents a location the aircraft shall stop at. If this attribute has no value, it is interpreted that the aircraft should stop at its current | In order for the HoldShort class to be valid, the threshold attribute's validation must pass, if it is not null. |

FIG. 23 (Continued)

| | | | |
|---|---|---|---|
| | | location. The threshold must be of type BaseArea, meaning it must be an object that has a location at an airport. | |
| Takeoff | A concrete class that represents a Takeoff Action for an airplane. | This class represents a command from an ATC for an aircraft to take off from a runway. Takeoff requires a Runway to take off from, assigned to the class's runway property. Additionally, the Takeoff action has a HasClearance parameter to indicate if the aircraft should pause for clearance before taking off. In this class, the runway must be of type Runway, meaning it must be an object that allows aircraft to takeoff. | In order for the Takeoff class to be valid, it has to have a value in its runway property. The runway must be of type Runway and it must also pass its own validation. |
| Taxi | Represents a Taxi action. | This class represents a command from an ATC for an aircraft to taxi to a location. Taxi requires a BaseArea to ultimately taxi to, assigned to the class's destination property. Additionally, the Taxi action has a 'via' parameter if the aircraft must pass through a BaseDynamicArea while taxiing to its destination. The via parameter is optional. | In order for the Taxi class to be valid, it has to have a value in its destination property. The destination must be of type BaseArea and it must also pass its own validation. If it has an intermediate location at via, that value must be of type BaseDynamicArea |

FIG. 23 (Continued)

|  |  |  | and must pass its own validation as well. |

*FIG. 24*

| ATC Builders and Classes | |
|---|---|
| ATC Builder | Builds various BaseActions for a parent ATCCommand.<br><br>An ATC Command is meant to hold all of the information that's within a sentence that an Air Traffic Controller may speak to an aircraft.<br><br>"Caravan123, taxi to gate 23."<br><br>"Caravan123, climb to 11,000 feet."<br><br>"Caravan123, you are cleared for takeoff."<br><br>An ATC Command consists of one or more ATC Actions within it, each action representing an instruction that the aircraft should follow.<br><br>"Cravan123, taxi to taxiway alpha."<br><br>In this example, the command consists of one action to taxi to taxiway.<br><br>"Caravan123, taxi to runway 35 via taxiway alpha and hold short of runway."<br><br>In this example, the command consists of two actions, taxi to a runway via an intermediate destination, and hold short.<br><br>The ATC Builder is a high-level builder that serves as a jumping-off point for building all of the actions within an ATC Command. |

FIG. 24 (Continued)

| | |
|---|---|
| | The ATC Builder contains several methods, each responsible for constructing a specific type of action that can be found within an ATC Command.<br>• Follow<br>• HoldShort<br>• Takeoff<br>• Taxi<br><br>Once any of these methods is called, a new, more specific builder is constructed and the program's scope is moved into this child builder. From there, the child builder allows the construction of the BaseAction it is designed the build. When the child builder's End method is called, the child builder finishes constructing its Action and returns the program's scope back up to the ATC Builder that first called it. The Action that was built by the child builder is then added to the running list of Actions the ATC Builder is tracking as it builds an ATC Command. From here, the ATC Builder may, through the methods listed above, build new Actions if the ATC Command it is building has more than one action, and the cycle repeats itself.<br><br>This continues as many times as needed until the ATC Builder's Build method is called. Once called, the Build method does the work of packing the stored Actions that were built during the lifetime of the ATC Builder into a new, final ATCCommand object. The ATCCommand is returned to the user and may be passed on to other programs as a standardized format of what originally was a spoken sentence from an Air Traffic Controller. |
| ATCCommand | A wrapper class that contains a BaseAction list to be performed in a command. |
| ActionBuilder | A Fluent Builder that is used to construct a BaseAction. |
| BaseAction | An abstract class that all other ATC Action types inherit.<br><br>All ATC Actions must derive from the BaseAction class. This restriction allows Actions to be distinguished from more generic BaseEntity objects in the ATC library. BaseAction isn't meant to be created directly, rather its purpose is to serve as a parent for |

FIG. 24 (Continued)

| | |
|---|---|
| | other Actions to inherit so that the type system can discriminate Actions from Entities.<br><br>ATC Actions can include (but aren't limited to):<br>• Follow<br>• HoldShort<br>• Taxi<br>• Takeoff<br>• Climb<br>• Descend |
| BaseArea | An abstract class for BaseEntity types that represent areas.<br><br>Areas represent categories of Entities that have a fixed location. All areas extend the BaseArea abstract class.<br><br>All Areas must have a unique identifier, typically unique to the airport they're located at. For example, Gates have identifiers like A3 or N13 and those identifiers are not repeated within the same airport. Typically, all areas in an airport can be found on an airport map.<br><br>Areas are subcategorized into two main groups.<br><br>Dynamic Areas<br><br>Areas that allow other entities to move through them.<br>• Runways<br>• Taxiways<br><br>Static Areas<br><br>Areas that do not allow other entities to move through them.<br>• Cargo Ramps<br>• Gates<br>• Parking Areas<br><br>BaseAreas use an AreaType to distinguish the types of area they |

FIG. 24 (Continued)

| | |
|---|---|
| | represent. They also contain a unique identifier, which should be unique to each airport. |
| BaseBuilder | Provides minimal methods necessary for building an object that implements IValidable<br>The ATC Library constructs the ATC Actions and ATC DataTypes through the use of Builders.The ATC Library is designed with the use-case of real-time parsing in mind, where the data types are constructed as information about them is understood over a period of time. Not everything will be known about data types as they're being built, so there needs to be a system of instantiating them that allows for dynamic construction while sentence parsing may still be occurring.<br><br>For this reason, the ATC Library makes use of the builder pattern of object-oriented programming. Builders are responsible for constructing objects over a range of time as new information about them becomes available to use. More specifically, the ATC Library uses a form of builder pattern known as the fluent builder pattern, where the helper methods on the builders return the builders themselves so that they can be chained together in a format that more closely resembles natural language. The fluent builder pattern allows for the building of objects like this:<br>// "Taxi to runway 35 and hold short."<br>ATCBuilder.Taxi()<br>   .To(new Runway(35))<br>   .HoldShort()<br>.End()<br><br>Within the ATC Library there are many types of builders, each responsible for constructing the pieces of information that are found within an ATC Command. If we start at the top-level, we have an ATC Builder, which is responsible for building the high-level concept of an ATC Command.<br><br>For more information about how builders work, see the section about the ATCBuilder. |
| BaseDynamicArea | An abstract class for a BaseArea that allows movement of a |

FIG. 24 (Continued)

| | |
|---|---|
| | BaseMoveable through it. |
| BaseEntity | An abstract class for all Entities in the ATC Library.<br><br>Entities<br><br>Entities represent people, places, and things in the ATC world—they're the "nouns" in the domain of Air Traffic Control.<br><br>Categories<br><br>Entities are categorized into various subcategories which are then used by the program's type system for more complex validations.<br><br>Areas<br><br>Areas are entities that fixed in their locations and derive from the BaseArea parent class.<br><br>Moveables<br><br>Moveables are entities that are capable of changing location. Moveable objects all derive from the BaseMoveable class. |
| BaseMoveable | An abstract class for all concrete objects that are moveable. |
| BaseStaticArea | An abstract class a BaseArea that is of the AreaType static. |
| CargoRamp | Represents a Cargo Ramp at an airport.<br>Overview<br><br>A Cargo Ramp requires an identifier attribute, which is a string used to uniquely identify the area in an Airport setting.<br><br>Validation<br><br>The Cargo Ramp is valid if it has an identifier attribute. |
| DynamicAreaBuilder | Responsible for building BaseDynamicAreas. |
| FollowBuilder | A builder responsible for building Follow actions. |

FIG. 24 (Continued)

| | |
|---|---|
| | Follow Builder<br><br>The builder works by constructing an instance of Follow once it is created. When its Leader method is called, it assigns the argument passed in to the Leader method to the Leader attribute of the Follow action it is building.<br><br>When its End method is called, it finishes building the Follow action and returns it to the ATCBuilder.<br><br>Example Usage<br>// Follow Caravan123.<br>let action = atc.Follow()<br>  .Leader(new Airplane('Caravan123'))<br>  .End(); |
| Gate | Represents a Gate at an airport.<br><br>Overview<br><br>A Gate requires an identifier attribute, which is a string used to uniquely identify the area in an Airport setting.<br><br>Validation<br><br>The Gate is valid if it has an identifier attribute. |
| HoldShortBuilder | A Fluent Builder that builds HoldShort actions.<br><br>Hold Short Builder<br><br>The builder works by constructing an instance of HoldShort once it is created. When its Of method is called, it assigns the argument passed in to the Of method to the Threshold attribute of the HoldShort action it is building.<br><br>When its End method is called, it finishes building the HoldShort action and returns it to the ATCBuilder. |

FIG. 24 (Continued)

| | |
|---|---|
| | Example Usage<br>// Hold short of Taxiway Alpha.<br>let action = atc.HoldShort()<br>  .Of(new Taxiway('Alpha'))<br>  .End();<br><br>// Hold short.<br>let action = atc.HoldShort()<br>  .End(); |
| Parking | Represents an airplane Parking area at an airport.<br><br>Overview<br><br>A Parking Area requires an identifier attribute, which is a string used to uniquely identify the area in an Airport setting.<br><br>Validation<br><br>The Parking Area is valid if it has an identifier attribute. |
| Runway | Represents a Runway at an airport.<br><br>Overview<br><br>A Runway requires an identifier attribute, which is a string used to uniquely identify the area in an Airport setting. It also requires a Heading which must be a number and corresponds to the direction the Runway is oriented. In cases where multiple runways have the same Heading at an airport, the Position parameter allows for Left, Right, or Center values and further distinguishes the Runway from others with similar headings.<br><br>Validation<br><br>A Runway is valid if it has a Heading and the Heading object passes its own validation. |
| StaticAreaBuilder | A Fluent Builder that builds BaseStaticAreas. |
| TakeoffBuilder | |

FIG. 24 (Continued)

| | |
|---|---|
| | A Fluent Builder that builds Takeoff actions.<br><br>Takeoff Builder<br><br>The builder works by constructing an instance of Takeoff once it is created.<br><br>When its Runway method is called, it assigns the argument passed in to the Runway method to the Runway attribute of the Takeoff action it is building.<br><br>When its Clearance method is called, it assigns the argument passed in to the Clearance method to the Clearance attribute of the Takeoff action it is building.<br><br>When its End method is called, it finishes building the Takeoff action and returns it to the ATCBuilder.<br><br>Example Usage<br>// Cleared for takeoff at Runway 110.<br>let action = atc.Takeoff()<br> .Runway(new Runway('110'))<br> .Clearance(true)<br> .End(); |
| TaxiBuilder | Responsible for building Taxi actions.<br><br>Taxi Builder<br><br>The builder works by constructing an instance of Taxi once it is created.<br><br>When its To method is called, it assigns the argument passed in to the To method to the To attribute of the Taxi action it is building.<br><br>When its Via method is called, it assigns the argument passed in to the Via method to the Via attribute of the Taxi action it is |

FIG. 24 (Continued)

| | |
|---|---|
| | building.<br><br>When its End method is called, it finishes building the Takeoff action and returns it to the ATCBuilder.<br><br>Example Usage<br>// Taxi to Gate B7 via Taxiway B.<br>let taxi = atc.Taxi()<br>  .To(new p.Gate('B7'))<br>  .Via(new p.Taxiway('B'))<br>.End(); |
| Taxiway | Represents a Taxiway on an airport.<br><br>Overview<br><br>A Taxiway requires an identifier attribute, which is a string used to uniquely identify the area in an Airport setting.<br><br>Validation<br><br>The Taxiway is valid if it has an identifier attribute. |
| Validation | A class that holds validation information for an object that is being validated. |

SYSTEM AND METHOD FOR AUTOMATED COMMUNICATION WITH AIR TRAFFIC CONTROL

TECHNICAL FIELD

The present disclosure relates to aircraft systems, and specifically to automated communication with air traffic control operators (e.g. an air traffic controller) in an air traffic control system.

BACKGROUND

Unmanned aircraft, or drones, are aircraft without a human pilot on board. An unmanned aircraft is a component of an unmanned aircraft system (UAS); which includes the unmanned aircraft, a human controller, and a system of communications between the two. The flight of unmanned aircraft may operate with various degrees of autonomy; either under remote control by the human operator or autonomously by onboard computers.

One aspect that is commonly under remote control by a human operator is the communication with Air Traffic Control. The operator needs to communicate with Air Traffic Control in order to properly control the aircraft. However, automating the process would lead to a reduction in operation costs and an increase in predictability and efficiency. Thus, there is a need for a system and method for automated communication for aircraft.

SUMMARY

The following presents a simplified summary of the disclosure in order to provide a basic understanding of certain examples of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a system for automated communication with Air Traffic Control. The system comprises a processor and memory. The memory stores instructions to execute a method. The method includes receiving audio communication input from an air traffic controller (e.g., a person) in the air traffic control (ATC) system. The audio communication input is then converted into text input. Next, an aircraft keyword is detected in the text input. The text input is then parsed and one or more data structures are generated from the parsed input. In some examples, the one or more data structures includes command data for controlling the aircraft. Next, the command data in the one or more data structures is verified. The one or more data structures are then transmitted to an onboard flight computer of the aircraft. Last, the one or more data structures are stored in a conversation memory.

In some examples, generating one or more data structures from the parsed input includes receiving an input text string and creating data type objects from the input text string. In some examples, verifying the command data includes sending data type objects to a validation module. In some examples, the validation module cross-checks command data against one or more of the following: airport data, en route data, aircraft location, and log data. In some examples, the validation module cross-checks command data against one or more of the following: mission specific flight requirements, aircraft limitations, and a global flight database. In some examples, the method further comprises generating a response to the audio communication input using a text-to-speech module. In some examples, the one or more data structures is used to modify a flight plan or route according to the audio communication input from an air traffic controller.

Another aspect of the present disclosure relates to an aircraft for implementing the method described above. Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular examples of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

FIG. 12A illustrates an example code representation of chaining in a nested fluent builder, in accordance with examples of the present disclosure.

FIG. 13 illustrates an example code implementation of a BaseAction abstract class, in accordance with examples of the present disclosure.

FIG. 14 illustrates an example code implementation of a ChangeAltitude abstract class, in accordance with examples of the present disclosure.

FIG. 15 shows an example code implementation of a BaseBuilder abstract class, in accordance with examples of the present disclosure.

FIG. 16 shows an example code implementation of an ActionBuilder abstract class, in accordance with examples of the present disclosure.

FIGS. 17A-17B show an example code implementation of an ATCBuilder abstract class, in accordance with examples of the present disclosure.

FIG. 23 illustrates a table listing ATC datatypes, in accordance with examples of the present disclosure.

FIG. 24 illustrates a table listing different builders, in accordance with examples of the present disclosure.

DETAILED DESCRIPTION

Figure 1:
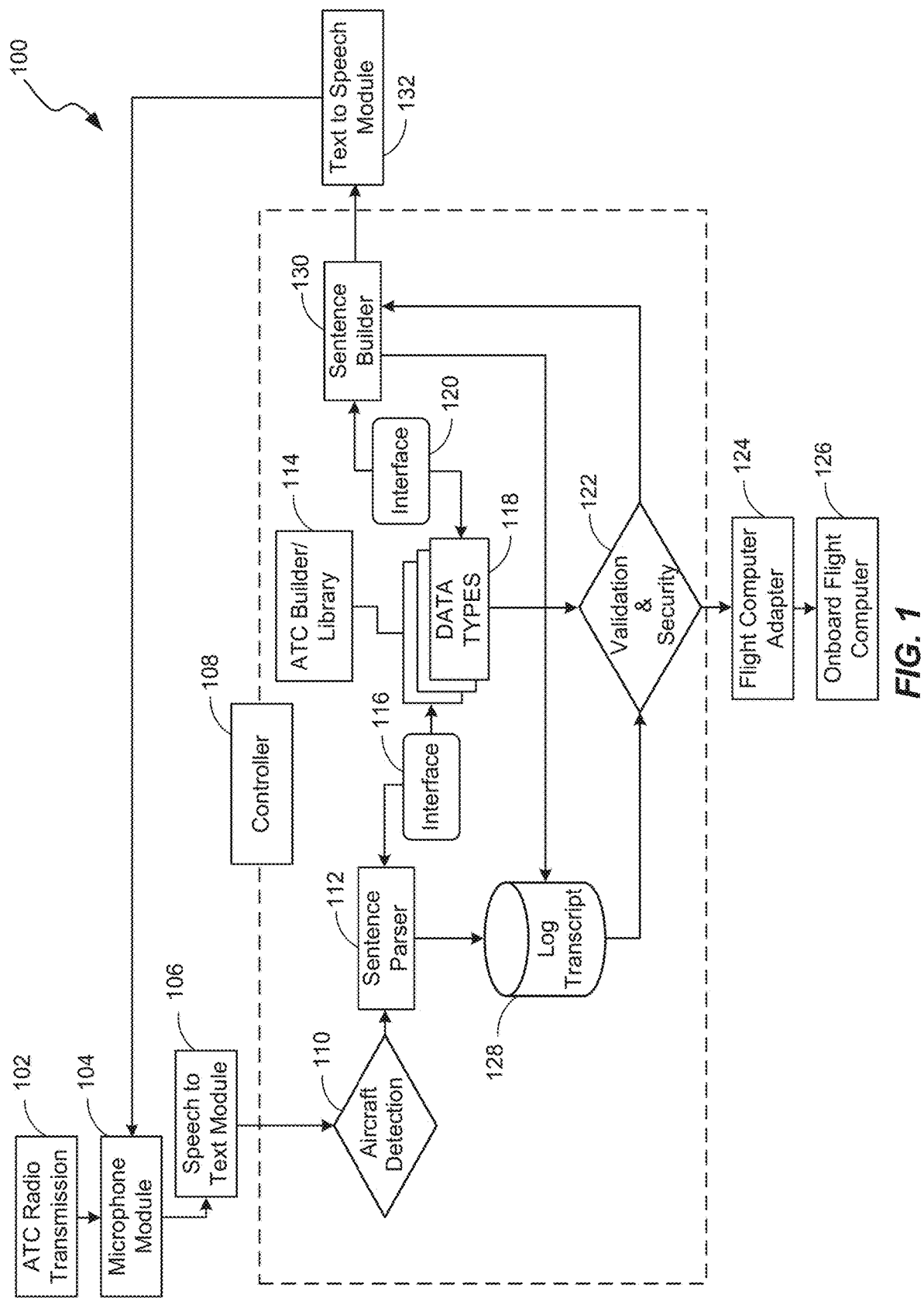
FIG. 1 shows an example of a system for automated communication with Air Traffic Control, in accordance with examples of the present disclosure.

Reference will now be made in detail to some specific examples of the disclosure including the best modes contemplated by the inventors for carrying out the disclosure. Various examples are illustrated in the accompanying drawings. While the disclosure is described in conjunction with these specific examples, it will be understood that it is not intended to limit the disclosure to the described examples. On the contrary, it is intended to cover alternatives, modifications, and equivalents as may be included within the spirit and scope of the disclosure as defined by the appended claims.

For example, the techniques of the present disclosure will be described in the context of automated communication for an aircraft, e.g., an unmanned aircraft system. However, it should be noted that the techniques of the present disclosure apply to a wide variety of unmanned vehicle systems, for example, unmanned automobile systems. Further, the techniques of the present disclosure may be applied to manned or piloted aircraft to, for example, offload certain tasks from a human operator. In the following description, numerous specific details are set forth in order to provide a thorough understanding of the present disclosure. Particular examples of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some examples include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

As mentioned above, automating aircraft communication can lead to a reduction in operation costs and an increase in predictability and efficiency. In various examples, Air Traffic Control (ATC) communicates commands to the aircraft. The commands control the actions of the aircraft. Thus, in order to automate communication with the aircraft, the system needs to transform the ATC communication into executable objects and processes that control the movement of the aircraft.

As used herein, "ATCBuilder" is used interchangeably with "ATC Builder." Similarly, any "[Object]Builder" is used interchangeably with "[Object] Builder." For example, "TaxiBuilder" is used interchangeably with "Taxi Builder." The same applies for "TakeoffBuilder" ("Takeoff Builder"), "HoldShortBuilder" ("HoldShort Builder"), "FollowBuilder" ("Follow Builder"), "ClimbBuilder" ("Climb Builder"), and "DescentBuilder" ("Descent Builder"). In addition, "ATCCommand" is also used interchangeably with "ATC Command."

FIG. 1 shows an example of a system for automated communication with Air Traffic Control, in accordance with examples of the present disclosure. System 100 receives, at a microphone module 104, an ATC radio transmission 102. In some examples, transmission 102 is a voice over radio transmission. In other examples, transmission 102 is any audio input received from ATC. Microphone module 104 then sends transmission 102 to a speech-to-text module 106 that converts the audio transmission into text. After speech-to-text module 106 converts the audio to text, the text is sent to controller 108, which is responsible for transforming the text communication into executable data objects. In some examples, the text communication is a text string.

Controller 108 receives the text communication and checks to see if the communication is directed to the correct aircraft using aircraft detection module 110. In some examples, checking to see if the communication is directed to the correct aircraft includes detecting an aircraft key word. In some examples, an aircraft key word is a tail number for the aircraft. If an aircraft key word is detected, then controller 108 proceeds to process the communication by passing the text communication through a sentence parser 112. Sentence parser 112 parses the text string to identify which data type objects need to be built by ATCBuilder 114.

In some examples, ATCBuilder 114 is an application programming interface (APT) that works with parser 112 to construct data type objects 118 from the text string. In some examples, data type objects 118 are specialized data structures that can be utilized by onboard flight computer 126 to control the actions/movements of the aircraft. In some examples, ATCBuilder 114 includes an interface 116 to receive the parsed text string. The interface allows different implementations of text parsers to use for the ATCBuilder. In some examples, interface 116 helps to prevent ATCBuilder 114 from being tightly coupled to any specific sentence parcer. ATCBuilder 114 will be described in further detail below. Once ATCBuilder 114 creates data type objects 118, the objects are then validated by validation and security module 122. Once validated, data type objects 118 are then sent to flight computer adapter 124 which passes the validated objects to onboard flight computer 126. In some examples, adapter 124 allows different implementations of flight computers to interact with ATCBuilder 114.

In some examples, once data type objects 118 are created and validated, they are then sent to sentence builder 130 for constructing a response sentence that will be relayed back to ATC. In some examples, ATCBuilder sends data type objects 118 to sentence builder 130 via interface 120. In some examples, interface 120 is different than interface 116. In some examples, the purpose of interface 120 is to allow ATCBuilder 114 to interact with different implementations of sentence builders. Like interface 116, interface 120 helps to prevent ATCBuilder 114 from being tightly coupled to any specific sentence builder. Once the response sentence has been constructed, text-to-speech module 132 will read the response sentence back to ATC. In some examples, sentence builder 130 builds predefined responses based on either the initial ATC radio transmission 102 or based on data type objects 118 received from interface 120. For example, if an ATC radio transmission is "climb to 30,000 feet," a predefined response can be "confirm climb to 30,000 feet." In some examples, if the command was determined to be invalid by validation and security module 122, sentence builder 130 can build an error message response.

In some examples, all communication from and to ATC are logged in a log transcript 128 or some other conversation memory. Log transcript 128 keeps track of all communications between ATC and the aircraft and can be used by validation and security module 122 to determine if a command is valid. More details regarding validation will be described below.

As mentioned above, ATCBuilder 114 constructs data type objects 118, using an .ATCBuilder library (which is part of ATCBuilder 114), which are then utilized by onboard flight computer 126. In some examples, ATCBuilder 114 is responsible for exposing builder methods to sentence parser 112, which then refers to an ATCBuilder library. In some examples, ATCBuilder 114 is a "fluent builder," which means it returns other builders. A builder is a class that is responsible for constructing other objects. In some examples, once a builder is invoked, it does not return the object right away. Instead the builder waits until it is told to finish building, and then subsequently returns the data type that it was asked to build. For example, a taxi builder will always return a "taxi" data type. Thus, for example, if an ATC command is "Taxi to runway 35 left," then ATCBuilder invokes the taxi method. FIGS. 2-7 illustrate different methods for ATCBuilder 114 to call to construct different specific builders.

Figure 2:
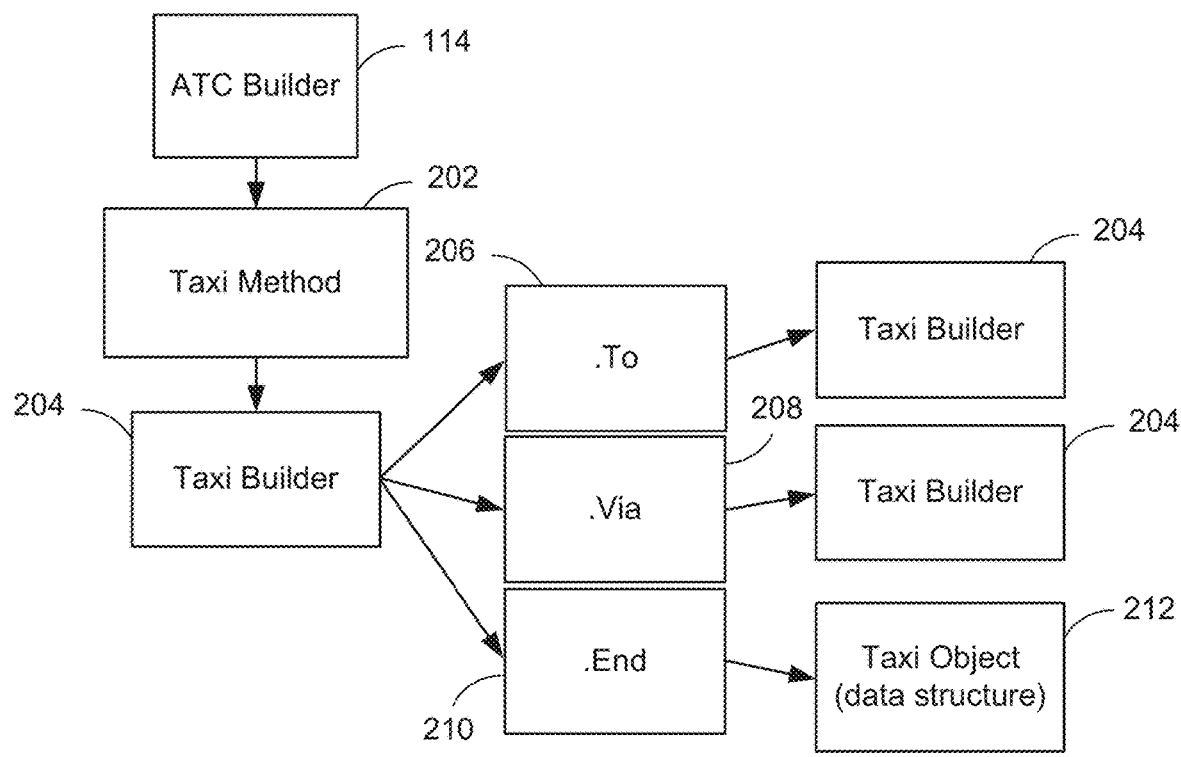
FIG. 2 shows an example flow chart for invoking a taxi method, in accordance with examples of the present disclosure.

FIG. 2 shows an example flow chart for invoking a taxi method, in accordance with examples of the present disclosure. ATCBuilder 114 invokes taxi method 202 from the ATCBuilder library in order to build a taxi object. In some examples, taxi method 202 creates a taxi builder to build a taxi object 212 based on input from the parsed ATC command. Thus, taxi method 202 returns a taxi builder 204, which has more specific builders within the builder. Taxi object 212 contains an "intermediate through destination," and a "final taxi destination." Taxi builder 204 has three methods: 1) .To method 206, 2) .Via method 208, and 3) .End method 210. Two of the methods, .To method 206 and .Via method 208 return back to taxi builder 204, thus allowing taxi builder 204 to continue building the taxi object. In some examples, this means that the control of the program goes back to the taxi builder 204 such that it can work on additional tasks. The .To method 206 assigns the "final taxi destination" on taxi object 212. The .Via method 208 assigns the "intermediate through destination" to taxi object 212. Taxi builder 204 returns taxi object 212 back to ATCBuilder 114 once the .End method 210 is called.

The taxi method is just one of the methods available for ATCBuilder 114 that invokes other builders. The ATCBuilder library contains a method for each command that invokes a specific builder. As with taxi builder 204, each specific command builder also includes various action methods, such as .To method 206 or .Via method 208. Only when a .End method, such as .End method 210, is invoked, does a specific builder return the specific object data structure. Thus, each ATC command leads to one "command" object, but the command object can have one or more different "action" objects.

Figure 3:
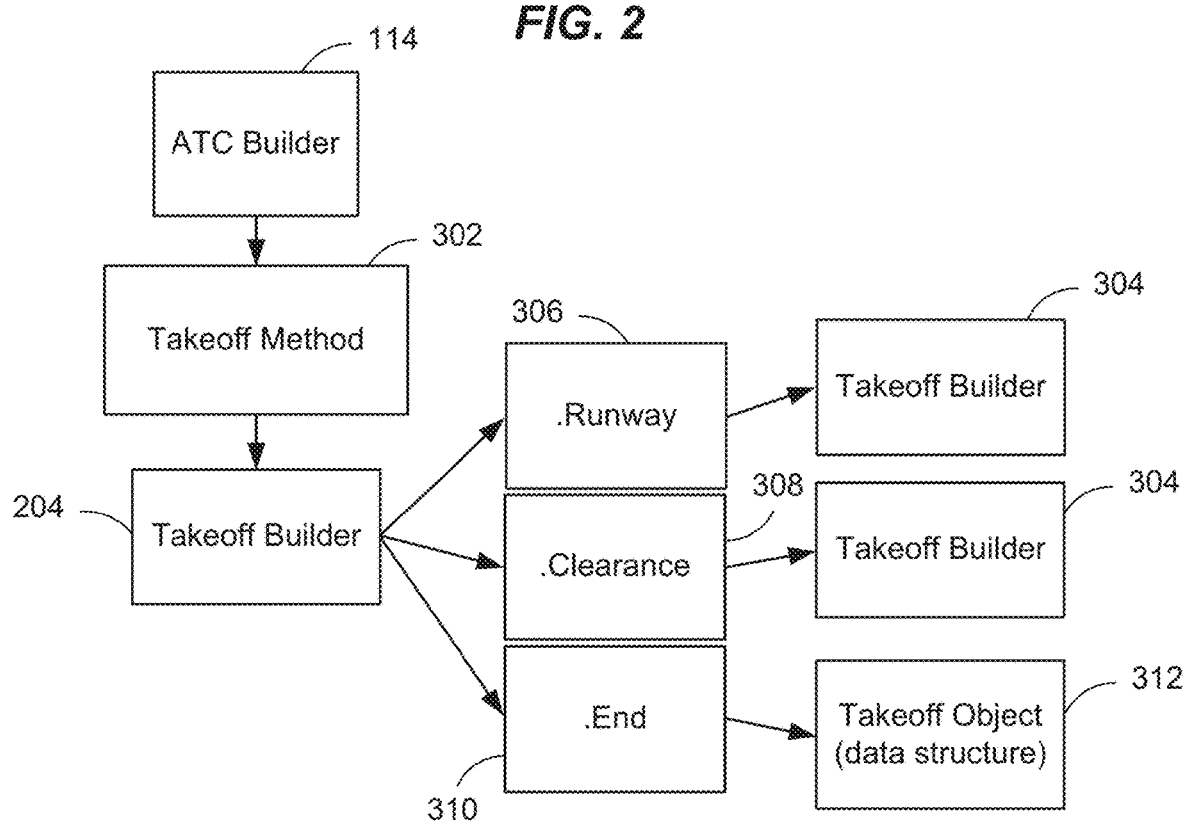
FIG. 3 shows an example flow chart for invoking a takeoff method, in accordance with examples of the present disclosure.

FIG. 3 shows an example flow chart for invoking a takeoff method, in accordance with examples of the present disclosure. ATCBuilder 114 invokes takeoff method 302 from the ATCBuilder library in order to build a takeoff object 312. Takeoff method 302 returns a takeoff builder 304, which also has more specific builders within the builder. Takeoff method 302 creates takeoff builder 304 to build takeoff object 312 based on input from the parsed ATC command. Takeoff object 312 contains a "runway designation" and a "clearance confirmation (True or False)." Takeoff builder 304 has three methods as well: 1) .Runway method 306, 2) .Clearance method 308, and 3) .End method 310. Two of the methods, .Runway method 306 and .Clearance method 308 return back to takeoff builder 304, which allows takeoff builder 304 to continue building the takeoff object. The .Runway method 306 assigns the "runway designation" on takeoff object 312. The .Clearance method 308 assigns the "clearance confirmation" on takeoff object 312. Takeoff builder 304 returns takeoff object 312 back to ATCBuilder 114 once the .End method 310 is called.

Figure 4:
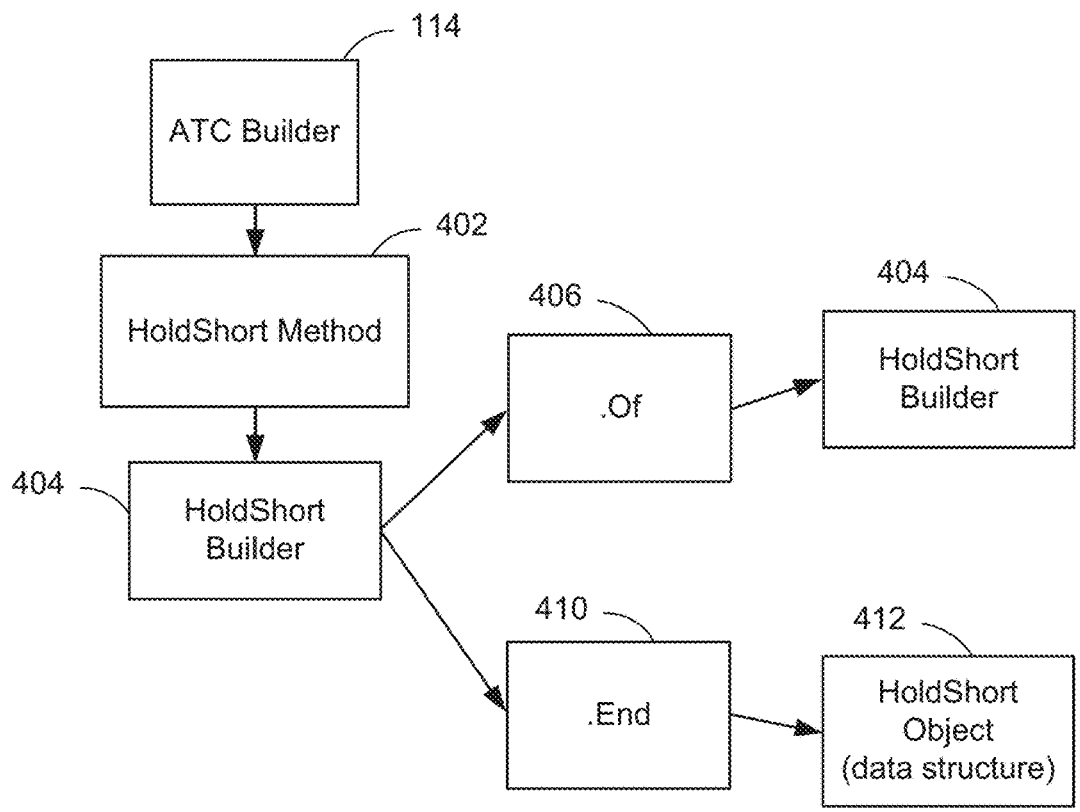
FIG. 4 shows an example flow chart for invoking a holdshort method, in accordance with examples of the present disclosure.

FIG. 4 shows an example flow chart for invoking a holdshort method, in accordance with examples of the present disclosure. ATCBuilder 114 invokes holdshort method 402 from the ATCBuilder library in order to build a holdshort object 412. Holdshort method 402 returns a holdshort builder 404, which also has more specific builders within the builder. Holdshort method 402 creates holdshort builder 404 to build holdshort object 412 based on input from the parsed ATC command. Holdshort object 412 contains a "threshold location of which the airplane holds short." Holdshort builder 404 has two methods: 1) .Of method 406, and 2) .End method 410. The .Of method 406 assigns the "threshold location" on holdshort object 412. The .Of method 406 returns back to holdshort builder 404, allowing holdshort builder 404 to continue building holdshort object 412. Holdshort builder 404 returns holdshort object 412 back to ATCBuilder 114 once the .End method 410 is called.

Figure 5:
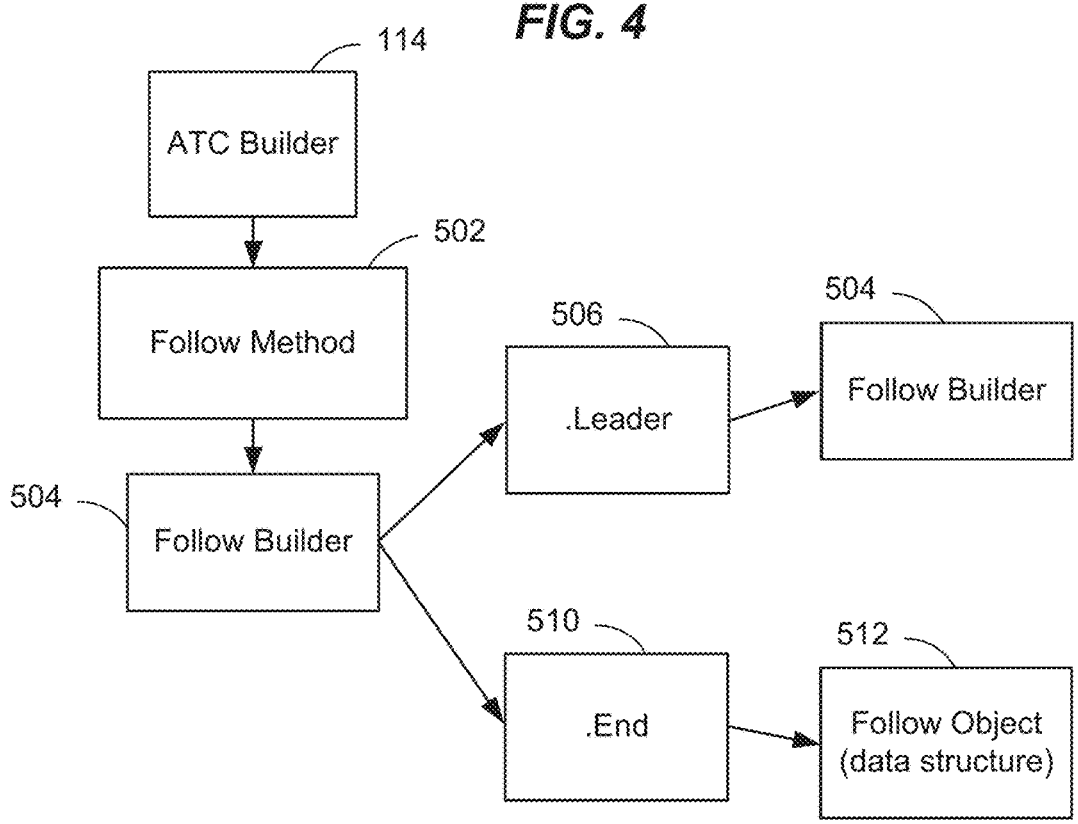
FIG. 5 shows an example flow chart for invoking a follow d, in accordance with examples of the present disclosure.

FIG. 5 shows an example flow chart for invoking a follow method, in accordance with examples of the present disclosure. ATCBuilder 114 invokes follow method 502 from the ATCBuilder library in order to build a follow object 512. Follow method 502 returns a follow builder 504, which also has more specific builders within the builder. Follow method 502 creates follow builder 504 to build follow object 512 based on input from the parsed ATC command. Follow object 512 contains a "designation of a moving target for the airplane to follow." Follow builder 504 has two methods: 1) .Leader method 506, and 2).End method 510. The .Leader method 506 returns back to follow builder 504. The .Leader method 506 assigns the "designation of a moving target for the airplane to follow" on follow object 512. The .Leader method 506 returns to follow builder 504, allowing for follow builder 504 to continue building follow object 512. Follow Builder 504 returns follow object 512 back to ATCBuilder 114 once the .End method 510 is called.

Figure 6:
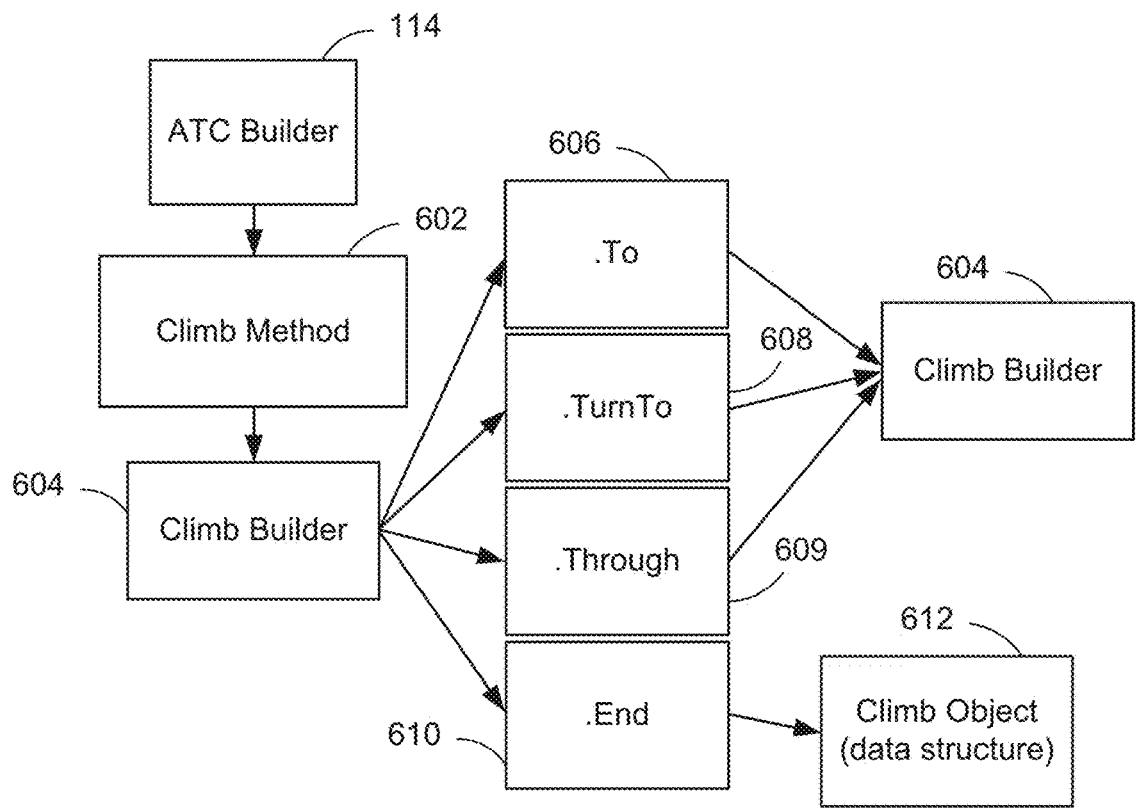
FIG. 6 shows an example flow chart for invoking a climb method, in accordance with examples of the present disclosure.

FIG. 6 shows an example flow chart for invoking a climb method, in accordance with examples of the present disclosure. ATCBuilder 114 invokes climb method 602 from the ATCBuilder library in order to build climb object 612. Climb method 602 returns a climb builder 604, which also has more specific builders within the builder. Climb method 602 creates climb builder 602 to build climb object 612 based on input from the parsed ATC command. Climb object 612 contains a "final climb altitude," an "airplane heading," and an "intermediate climb altitude." Climb builder 604 has four methods: 1) .To method 606, 2) .Turn to method 608, 3) .Through method 609, and 4).End method 610. Three of the methods, .To method 606, .Turnto method 608, and .Through method 609 return back to climb builder 604, allowing for climb builder 604 to continue building climb object 612. The .To method 606 assigns the "final climb altitude" on climb object 612. The .TurnTo method 608 assigns the "final climb altitude" on climb object 612. The .Through method 609 assigns the "intermediate climb altitude" to climb object 612. Climb builder 602 returns climb object 612 back to ATCBuilder 114 once the .End method 610 is called.

Figure 7:
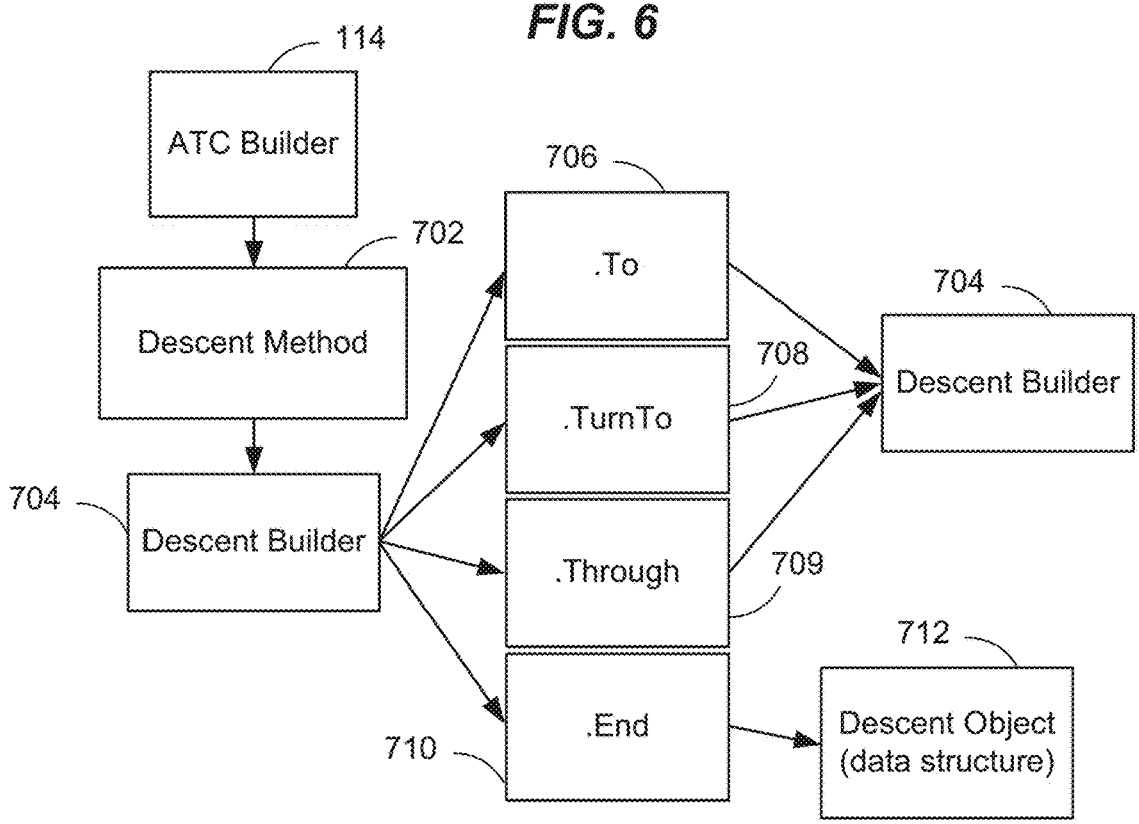
FIG. 7 shows an example flow chart for invoking a descent method, in accordance with examples of the present disclosure.

FIG. 7 shows an example flow chart for invoking a descent method, in accordance with examples of the present disclosure. ATCBuilder 114 for calls descent method 702 from the ATCBuilder library in order to build descent object 712. Descent method 702 returns a descent builder 704, which also has more specific builders within the builder. Descent method 702 creates descent builder 704 to build descent object 712 based on input from the parsed ATC command. Descent object 712 contains a "final descent altitude," an "airplane heading," and an "intermediate descent altitude." Descent builder 704 has four methods: 1).To method 706, 2).Turnto method 708, 3).Through method 709, and 4).End method 710. Three of the methods, .To method 706, .Turnto method 708, and .Through method 709 return back to descent builder 704, allowing for descent builder 704 to continue building descent object 712. The .To method 706 assigns the "final descent altitude" on descent object 712. The .TurnTo method 708 assigns the "airplane heading" on descent object 712. The .Through method 709 assigns the "intermediate descent altitude" on descent object 712. Descent builder 704 returns descent object 712 back to ATCBuilder 114 once the .End method 710 is called.

Figures 8A, 8B:
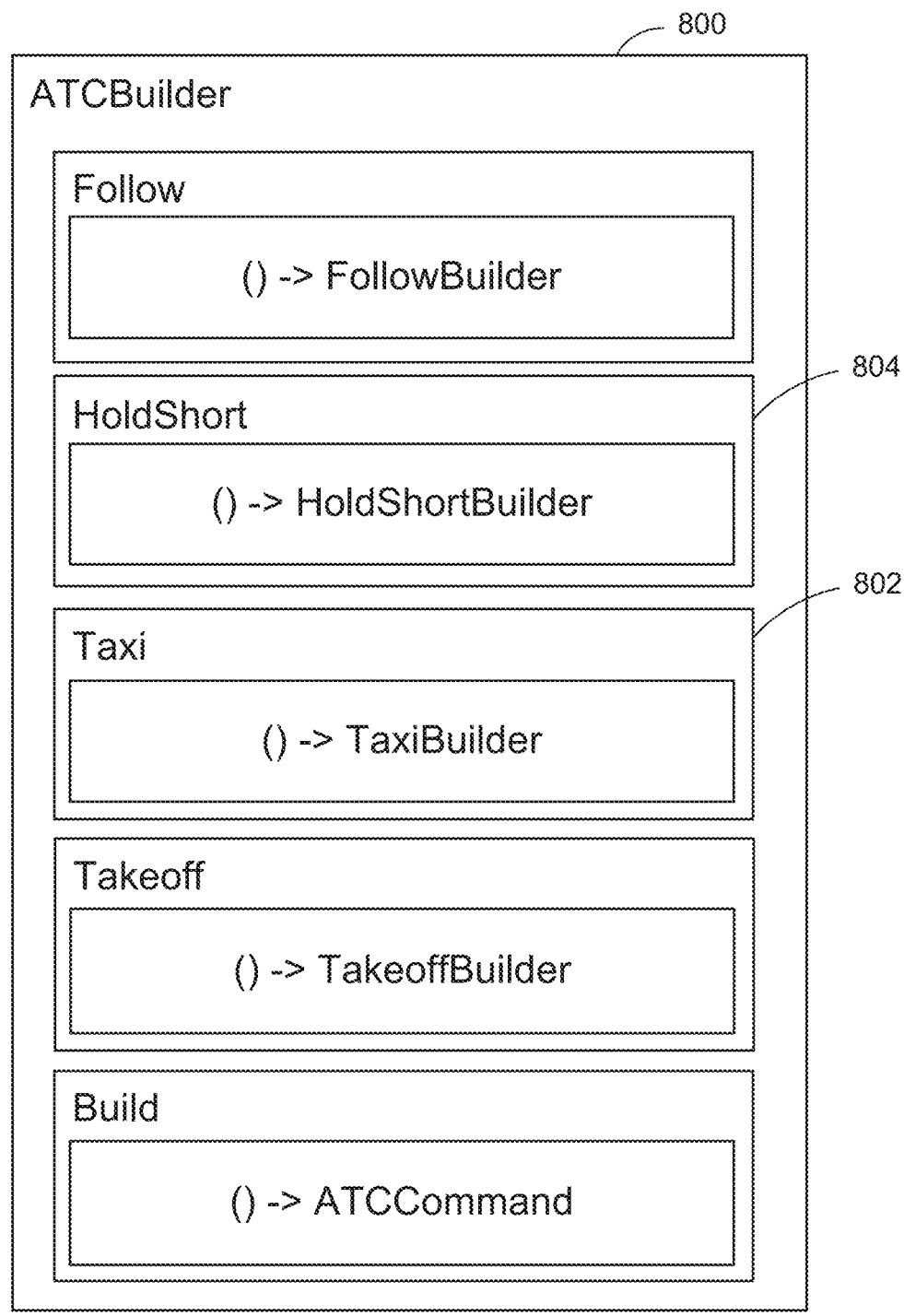
FIG. 8A illustrates an example code representation of a call fora newbuilder object, in accordance with examples of the present disclosure.
FIG. 8B illustrates a graphical user interface (GUI) display of an example ATCBuilder object, in accordance with examples of the present disclosure.

To further understand how ATCBuilder 114 works, FIGS. 8A-10B will be used to illustrate an example of sentence parser 112 using the ATCBuilder library to help accomplish its task of constructing data type objects 118 (or "ATCData-Types"). In the example, the following text string is received as input to sentence parser 112: "Taxi to runway 35 left." As sentence parser 112 parses this sentence, it uses the ATCBuilder library to construct an ATCDataType that represents the instructions the command/instructions from ATC. Sentence parser 112 first starts out by making a new ATCBuilder object that it can use to further construct ATCCommands. FIG. 8A illustrates an example code representation of a call for new builder object, in accordance with examples of the present disclosure. At this point, "builder" is an ATCBuilder type, which is a parent object that provides more specific builders for parser 112 to use as it see fit. FIG. 8B illustrates a graphical user interface (GUI) display of the new ATCBuilder object, in accordance with examples of the present disclosure. It should be noted that ATCBuilder object 800 includes five method objects, including taxi method object 802.

In some examples, .ATCBuilder follows a nested fluent builder pattern, which means that it contains methods that return more specialized builders. As these methods are called, the current operating scope dives down into the child builder being used. Each child builder contains a method that allows the scope to bubble back up to the parent ATCBuilder. In some examples, the ATCBuilder has a "build" method that is responsible for exiting the build scope entirely and retuning an ATCCommand object.

Figures 9A, 9B:
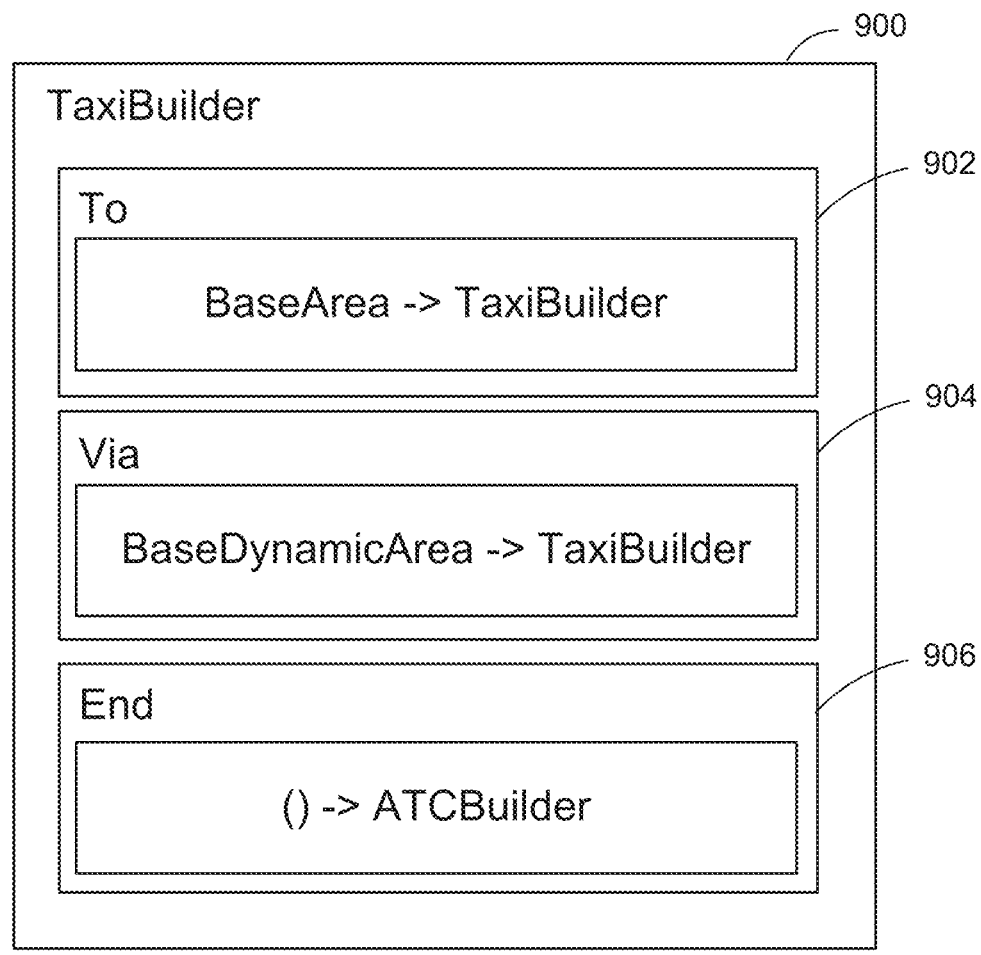
FIG. 9A illustrates an example code representation of calling a taxi command, in accordance with examples of the present disclosure.
FIG. 9B illustrates a GUI display of an example TaxiBuilder object, in accordance with examples of the present disclosure.

Referring back to the example, parser 112 next determines that it needs to build a Taxi command, so it calls taxi method 802 on the ATCBuilder library that is imported into its programming. FIG. 9A illustrates an example code representation of calling the taxi command, in accordance with examples of the present disclosure. At this point, "builder" is now a TaxiBuilder object, which is a builder that is responsible for building Taxi actions. FIG. 9B illustrates a GUI display of an example TaxiBuilder object, in accordance with examples of the present disclosure. As shown in FIG. 9B, the TaxiBuilder object contains helper methods specific to building a Taxi action.

TaxiBuilder object 900 contains two methods that the parser can use to construct a TaxiAction object. The first method is "To" method 902. "To" method 902 takes a BaseArea object as its input and returns the TaxiBuilder 900 itself. The second method is "Via" method 904, which is similar to "To" method 902, but takes a BaseDynamicArea as its input instead. TaxiBuilder 900 also includes an "End" method 906, which requires no input and is used to exit TaxiBuilder 900 and return to the parent builder object scope.

Figures 10A, 10B:
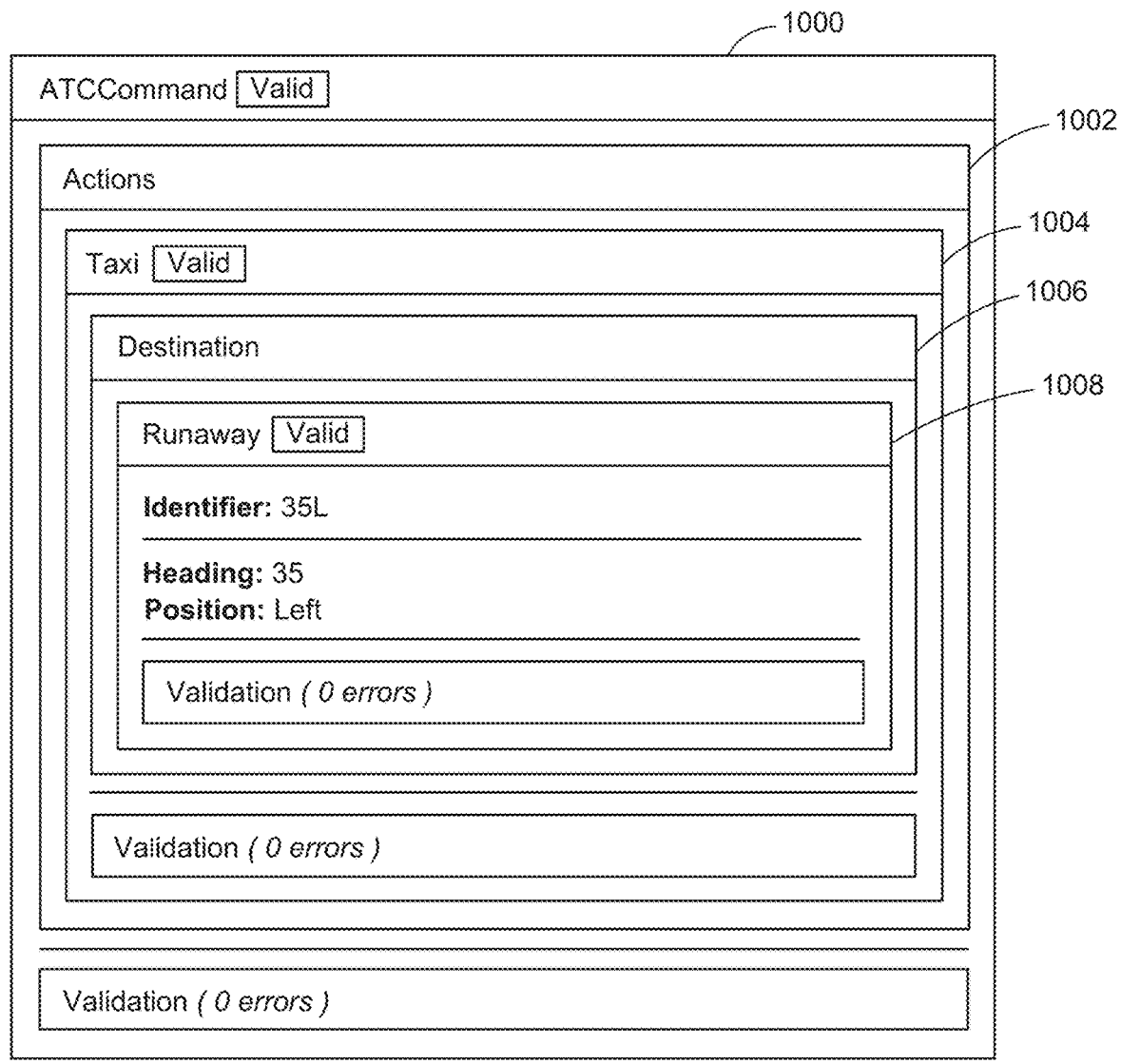
FIG. 10A illustrates an example code representation of building a taxi command, in accordance with examples of the present disclosure.
FIG. 10B illustrates a GUI display of an example ATCCommand object, in accordance with examples of the present disclosure.

As parser 112 does its work, it can use the "To" and "Via" methods as it determines the specific instructions in the Taxi sentence it is parsing. When parser 112 believes it is finished parsing the Taxi sentence, it can use "End" method 906 to construct the TaxiAction object it needs, knowing that the inputs it provided along the way via the "To" and "Via" methods will be populated inside the resulting TaxiAction object. Finally, parser 112 then calls the "Build" method to exit ATCBuilder and return an ATCCommand object with the TaxiAction object nested inside. FIG. 10A illustrates an example code representation of building a taxi command, in accordance with examples of the present disclosure.

Parser 112 determines that the Taxi sentence is instructing the aircraft to taxi to a Runway. A Runway is an object that derives from BaseArea abstract class, so it is an appropriate input for the "To" method 902. In this example, the Runway is constructed with two arguments, a Heading (35) and a Position ("left"). Once parser 112 believes it is done parsing the Taxi command, it calls "End" to finish construction of the Taxi action. Parser 112 then also calls "Build" to pack the Taxi action into an ATCCommand object. FIG. 10B illustrates a GUI display of an example ATCCommand object 1000, in accordance with examples of the present disclosure. As shown in FIG. 10B, the resulting output of using the TaxiBuilder in the ATCBuilder library is an ATCCommand object 1000, with one action inside its Actions attribute 1002. The action is a Taxi object 1004 with a Destination attribute 1006. The Destination attribute 1006 is a Runway object 1008 with a Heading of 35, a Position of "Left," and a unique Identifier of "35L." Further, internal validation of the object has found no errors with the parameters used to construct ATCCommand object 1000. ATCCommand object 1000 can now be used in other parts of an aircraft system, such as an autonomous aircraft system. In some examples, standardization rules were enforced during the creation of ATCCommand object 1000 by constraints built in to the ATCBuilder library. In such examples, programs such as sentence parser 112 do not need to be concerned with the rules of how to construct an ATCCommand. The programs need only use the methods available to them through the ATCBuilder library.

Figures 11A, 11B:
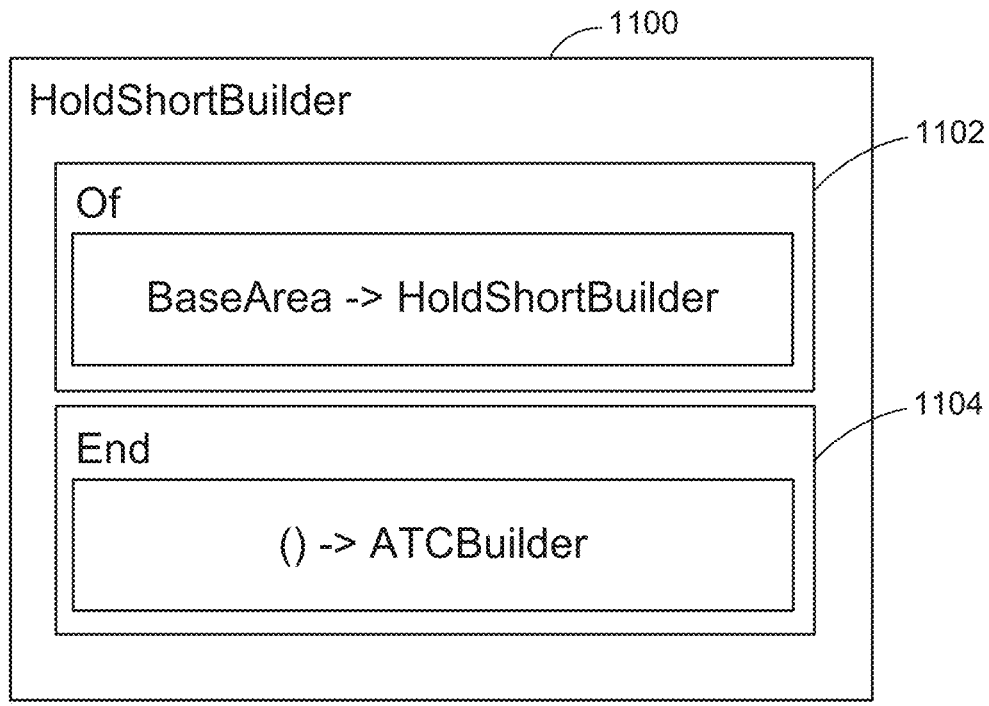
FIG. 11A illustrates an example code representation of building an ATCCommand object, in accordance with examples of the present disclosure.
FIG. 11B illustrates a GUI display of an example HoldShortBuilder object, in accordance with examples of the present disclosure.

The example illustrated in FIGS. 8A-10B show an example of transforming a simple ATC command into an ATCCommand object. FIGS. 11A-12B illustrate a more complex example using a more complicated ATCCommand. A more complex Taxi sentence received as input by parser 112 would be "Taxi to runway 35 L and hold short of taxiway A," Using the ATCBuilder library, parser 112 will parse the sentence and generate an ATCCommand object with two actions inside of it, a Taxi action and a HoldShort action. FIG. 11A illustrates an example code representation of building this more complex ATCCommand object, in accordance with examples of the present disclosure.

In the more complex example, the use of "End" commands becomes necessary because parser 112 needs to use two different kinds of builders to build out the ATCCommand object. First, parser 112 calls "Taxi" to work with a TaxiBuilder, as previously described in the simple example. Once parser 112 believes it has finished building out the Taxi action, it calls "End" to return back to the parent ATCBuilder scope. While in the parent ATCBuilder scope, parser 112 now has access to additional child builder methods, such as "HoldShort" method 804, illustrated in FIG. 8B. As with Taxi method 802, HoldShort method 804 also calls builder object. FIG. 11B illustrates a GUI display of an example HoldShortBuilder object, in accordance with examples of the present disclosure. Calling HoldShort method 804 drills down into a HoldShortBuilder 1100 object scope. HoldShortBuilder 1100 contains the familiar "End" method 1104. In addition, HoldShortBuilder 1100 also contains an "Of" method 1102 that takes a BaseArea as an input. The "Of" method 1102 is used to assign a threshold that the HoldShortAction instructs the aircraft not to cross when it eventually holds short.

Figure 12B:
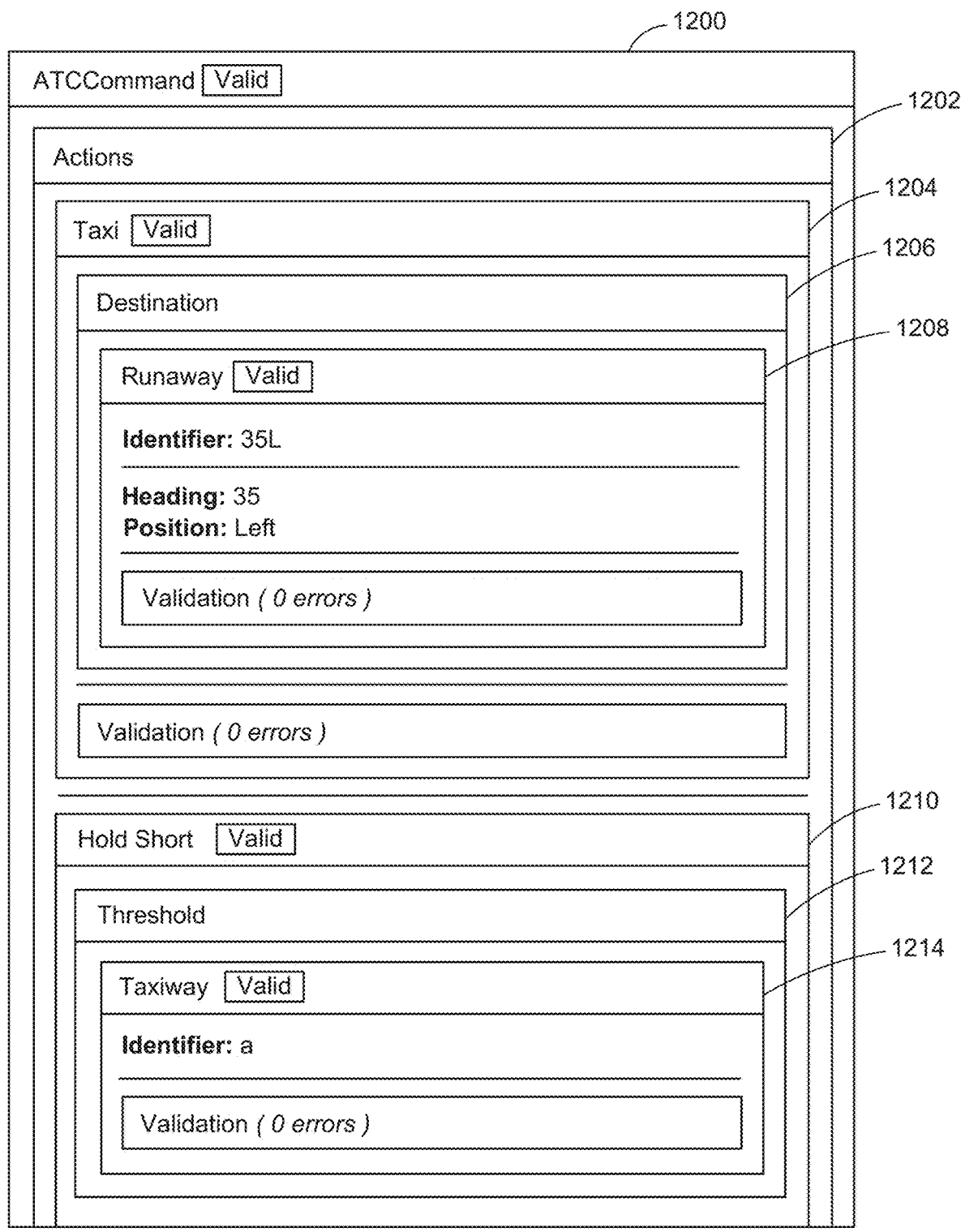
FIG. 12B illustrates a GUI display of another example an ATCCommand object, in accordance with examples of the present disclosure.

In some examples, because the builder uses a nested fluent builder pattern, the code can be made more concise through the use of chaining. FIG. 12A illustrates an example code representation of chaining in a nested fluent builder, in accordance with examples of the present disclosure. It should be noted that in both code examples given in FIGS. 11A and 12A, calling the "Build" method exits the ATCBuilder and returns a populated ATCCommand object. FIG. 12B illustrates a GUI display of this ATCCommand object, in accordance with examples of the present disclosure. ATCCommand object 1200 consists of two actions inside its Actions list 1202. The first action is Taxi action 1204, and runway object 1208 inside destination attribute 1206, similar to ATCCommand object 1000 in FIG. 10B. However, ATCCommand object 1200 also includes a second action HoldShort action 1210 with a Threshold attribute 1212. Threshold attribute 1212 points to a Taxiway object 1214 with an Identifier of "a."

In some examples, ATCCommand can also be used downstream from sentence parser 112 in other programs that are designed to work with ATCCommands. For example, ATC data types can be used in any downstream application that benefits from a standardized input of ATC instructions given to the aircraft. Such applications can include conversation systems which allow the aircraft to better understand the context of single ATC commands throughout a flight, a security system which allow the aircraft to determine which commands are likely being spoofed, and the aircraft flight computer. As shown in the more complicated example illustrated in FIGS. 11A-12B, chaining actions together is made possible using the nested fluent builder pattern. The pattern allows for the code to drill down into a specific builder scope when appropriate and then bubble back up to the parent scope to make further child builders available to it. As the code drills down and bubbles back up, the parent builder adds the actions constructed to its actions list. In some examples, complex instructions can be built up from simple commands in such a manner.

Although some ATCBuilder methods have been described above, FIGS. 13-17B show just a few examples of code implementations for different classes. FIG. 13 illustrates an example code implementation of a BaseAction abstract class, in accordance with examples of the present disclosure. BaseAction is an abstract class, it extends BaseEntity. Anything that inherits BaseAction is an Action type. FIG. 14 illustrates an example code implementation of a ChangeAltitude abstract class, in accordance with examples of the present disclosure. ChangeAltitude is an abstract class, it extends BaseAction. FIG. 15 shows an example code implementation of a BaseBuilder abstract class, in accordance with examples of the present disclosure. BaseBuilder is the abstract class that all builders inherit from. BaseBuilder contains an "end" method, which builds an object that implements the IValidable interface and returns it. BaseBuilder also contains a "validate" method, which runs validation on the IValidable being built. FIG. 16 shows an example code implementation of an ActionBuilder abstract class, in accordance with examples of the present disclosure. ActionBuilder builds ATC Datatypes that extend the BaseDynamicArea abstract class. ActionBuilder allows the assignment of an identifier to the BaseDynamicArea being built through the "identifier" method. ActionBuilder also contains an "end" method that validates the BaseDynamicArea being and returns it. FIGS. 17A-17B show an example code implementation of an ATCBuilder abstract class, in accordance with examples of the present disclosure. The ATCBuilder is an abstract class responsible for building ATCCommand datatypes. The ATCBuilder abstract class also contains methods to construct specific child builder types. In addition, the ACTBuilder is a pattern for and defines behaviors common to all child builder types. For example, FIGS. 17A-17B show an example (.Build) method, which is implemented in the child builder type, and is called to construct the specific command object. This approach allows the new complex code to be added and integrated into the program without disrupting the structure of the ATCBuilder code. ATCBuilder also contains methods for creating child builders that construct Follow commands, HoldShort commands, Taxi commands, and Takeoff commands.

The classes and datatypes described above only form part of the ATCBuilder library 114. A more robust description of ATCBuilder datatypes and other builders are represented in FIGS. 23 and 24. FIG. 23 illustrates a table listing ATC datatypes, in accordance with examples of the present disclosure. FIG. 24 illustrates a table listing different builders, in accordance with examples of the present disclosure.

After data type objects 118 are created by ATCBuilder 114, they are then sent to validation and security module 122. Validation and security module 122 plays a critical role in automated communication systems because it acts as a gateway to ensure the vehicle is not directed to perform dangerous maneuvers, to detect spoofing of ATC commands, and to detect mistakes in ATC commands. In some examples, validation of commands and advisories issued by ATC is done by cross-checking data from various information sources. When discrepancies are detected from these sources, the system will be prompted to either ask ATC for clarification or inform ATC that it is unable to comply. The sources of cross-references information include, but are not limited to: 1) previous commands and the current route, 2) database of locations and routes, to ensure the vehicle is not directed to travel somewhere that does not exist, 3) 3D models of the terrain and structures, to ensure the vehicle is not directed to fly into the ground or buildings (e.g., terrain or structures) 4) performance limitations of the vehicle, to ensure they are not exceeded, 5) direction of the ATC radio transmission, to detect whether it is coming from an unknown source, and 6) signature of the ATC voice, to check whether it is consistent with the same voice in the on-going conversation.

Figure 18:
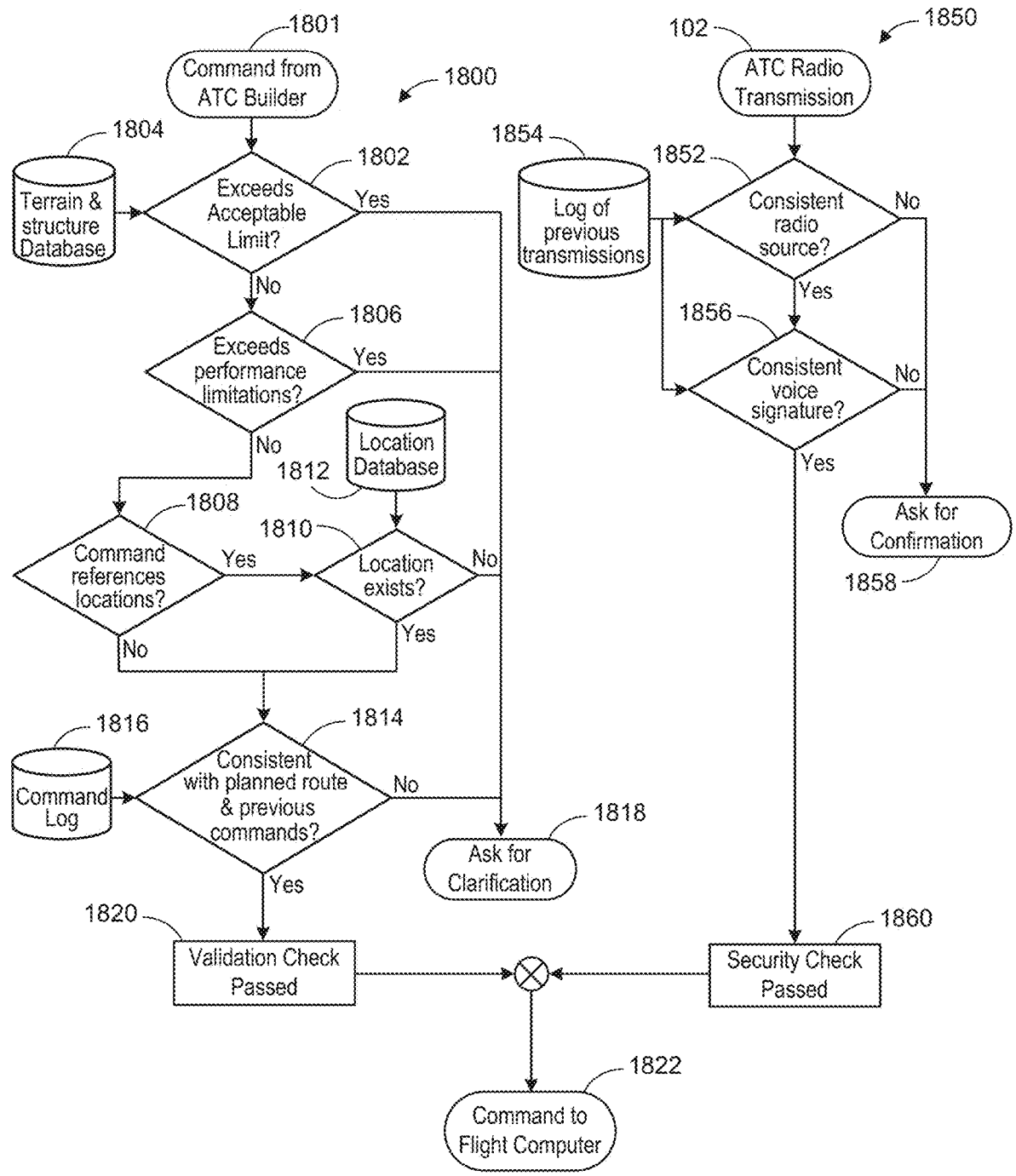
FIG. 18 illustrates a flow chart of example processes for validation and security, in accordance with examples of the present disclosure.

In some examples, the validation and security module 122 runs once for every command. FIG. 18 illustrates a flow chart of example processes for validation and security, in accordance with examples of the present disclosure. The left side of FIG. 18 represents the validation module 1800. The right side of FIG. 18 represents the security module 1850. When validation module 1800 receives a command 1801 from ATCBuilder 114, it first checks 1802 to see if the command could exceed one or more acceptable limits. For example, if a minimum spacing requirement may be violated by executing the command, the command could exceed acceptable limits. First check 1802 is cross-referenced with terrain and structure database 1804. Next, validation module 1800 checks 1806 to see if the command would require the aircraft to exceed performance limitations. For example, if the command told the aircraft to expedite a climb, the second check will determine if expediting the climb would exceed safety thresholds. This second check 1806 is checked against the performance specifications of the aircraft. Next, validation module 1800 checks 1808 to see if the command references any locations. If it does, then validation module 1800 further checks 1810 to see if the location actually exists against a location database 1812. In some examples, location database 1812 is an airport map. Last, validation module 1800 checks 1814 to see if the current command is consistent with the planned route and previous commands. For example, if the sequence of commands that ATC gives the aircraft were consistent with lining up the aircraft to land on runway 16L, then suddenly the controller changes and gives a clearance to land on runway 16R, then this would trigger an warning flag that the new command might be lining the aircraft along the wrong runway. This last check 1814 is checked against the command log 1816.

In some examples, if any of the checks did not pass, either an error message or a request for (e.g. ask for) clarification 1818 would be relayed to ATC. If the validation check passed 1820, then the module waits to see if the security module 1850 has cleared the radio transmission.

While validation module 1800 is validating the commands, security module 1850 is checking to make sure a malicious actor has not spoofed the radio transmission. Security module 1850 receives the ATC radio transmission 102 and first checks 1852 to see if the radio source is consistent. This is checked against the log of previous transmissions 1854. In some examples, security module 1850 optionally checks (not shown) to see if transmission is tuned to the right frequency. Next, security module 1850 also checks 1856 to see if the voice signature for the controller is consistent with previous transmissions. If neither security check is consistent, then security module 1850 will either send an error message or request (e.g. ask for) confirmation 1858 from ATC. If both radio source and voice signature are consistent, then the radio transmission passes the security check 1860. If both validation and security checks have passed, then the command gets sent to the flight computer 1822.

Now that the validation and security module has been explained in detail, a few examples of how the validation and security module operates are provided herein.

A first example involves an aircraft being vectored (directed) to land on a specific runway in an airport. In such an example, ATC issues a series of radar vectors for the aircraft to fly which will position it to land on a specific runway (example runway 16R). The aircraft flies this series of vectors, storing both its location and a log of issues commands. ATC clears the aircraft to land on a different runway (example runway 16C). By cross-checking the aircraft's location, its flight path, and the stored log of previous commands, an alert would be triggered by the validation module. This alert would prompt the system to communicate with ATC to verify which runway the aircraft should be landing on.

A second example involves an aircraft cruising and being asked to climb to a higher altitude. In such an example, ATC issues a command for the aircraft to climb to and maintain a higher altitude from its original cruising altitude (example—from 15,000 ft to 20,000 ft). By cross-checking with the aircraft's performance limitations an alert would be triggered by the validation module. This alert would prompt the system to communicate with ATC and state that climbing to the requested altitude would be beyond the performance limits of the aircraft.

A last example involves an aircraft taxiing to a specific runway via a specific taxiway. In such an example, ATC issues a command to the aircraft instructing it to taxi to a specific runway via a specific taxiway. By cross-checking with the onboard GPS database, an alert would be triggered if, given the location of the aircraft, the aircraft would be unable to get to the runway using the taxiway mentioned, or if either the taxiway or runway did not exist on the current airport. This alert would prompt the system to communicate with ATC and state that the reason the alert was generating, thus prompting further instructions/clarification from the ATC.

Figure 19:
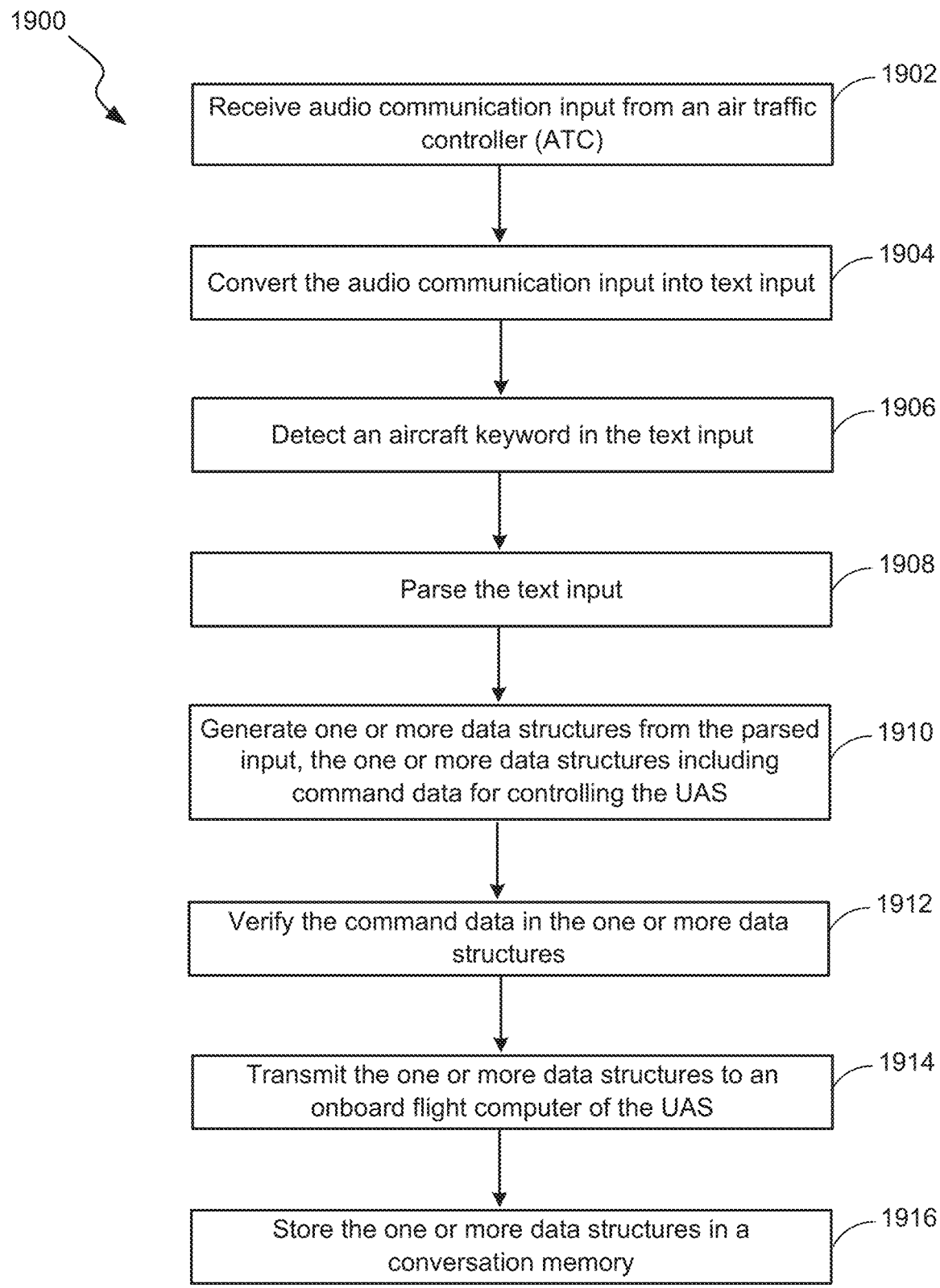
FIG. 19 shows a flowchart of a method for automated communication, in accordance with examples of the present disclosure.

FIG. 19 shows a flowchart of a method 1900 for automated communication with an aircraft, in accordance with examples of the present disclosure. Method 1900 can be executed by a processor and memory. Method 1900 includes receiving (1902) audio communication input from an air traffic controller (ATC). Then, the audio communication input is converted (1904) into text input. Next, an aircraft keyword in the text input is detected (1906). Then, the text input is parsed (1908). Next, one or more data structures is generated (1910) from the parsed input. In some examples, the one or more data structures includes command data for controlling the aircraft. Next, the command data in the one or more data structures is verified (1912). Then, the one or more data structures is transmitted (1914) to an onboard flight computer of the aircraft. Last, the one or more data structures is stored (1916) in a conversation memory.

Figure 20:
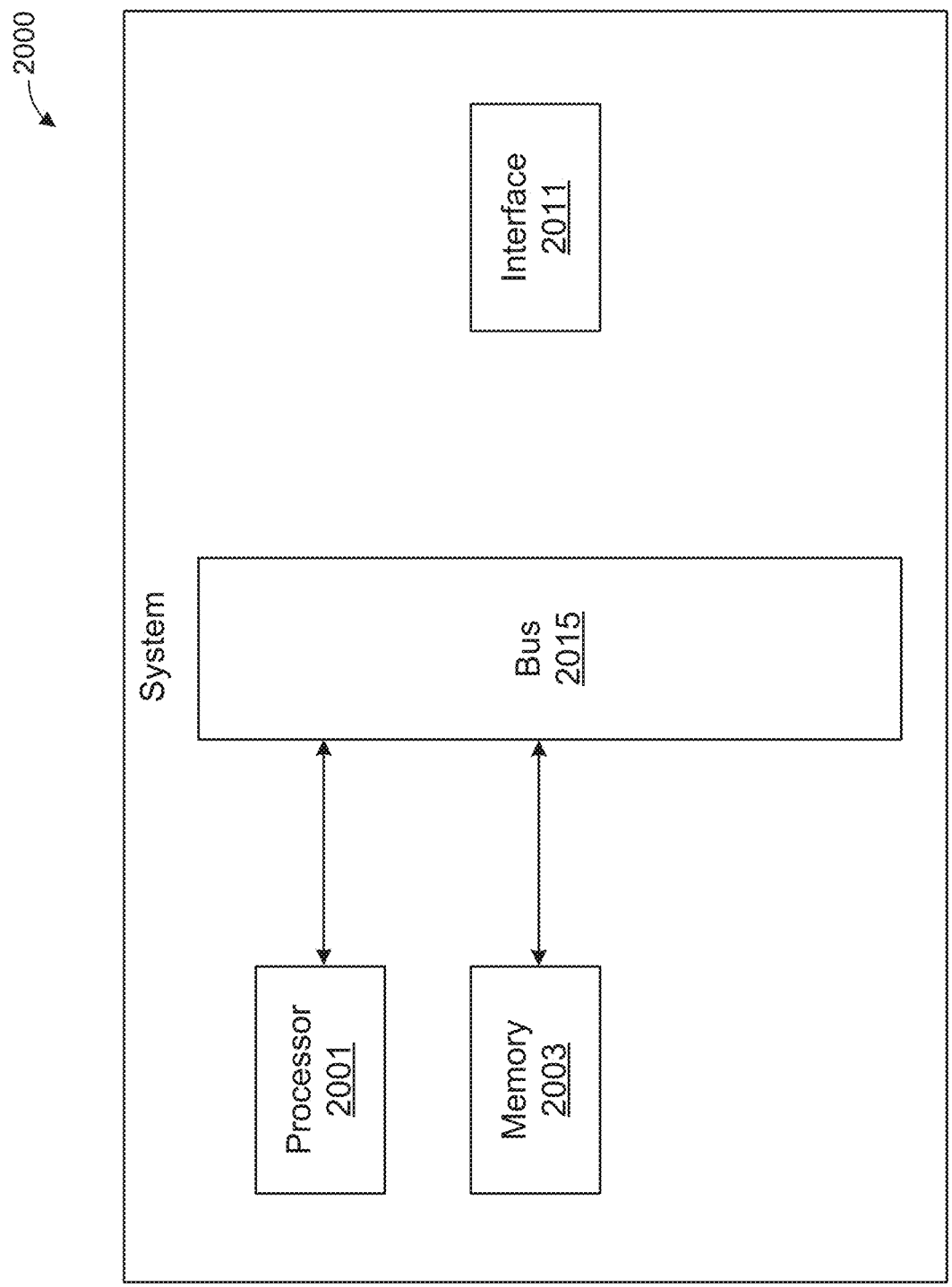
FIG. 20 illustrates a block diagram of an example of a system capable of implementing various processes described herein, in accordance with one or more examples of the present disclosure.

FIG. 20 is a block diagram illustrating an example of a system 2000 capable of implementing various processes described in the present disclosure. According to particular examples, a system 2000, suitable for implementing particular examples of the present disclosure, includes a processor 2001, a memory 2003, an interface 2011, and a bus 2015 (e.g., a Peripheral Component Interconnect (PCI) bus or other interconnection fabric) and operates as a streaming server. In some examples, when acting under the control of appropriate software or firmware, the processor 2001 is responsible for the various steps described in any method described herein. Various specially configured devices can also be used in place of a processor 2001 or in addition to processor 2001.

The interface 2011 is typically configured to send and receive data packets or data segments over a network. Particular examples of interfaces supports include Ethernet interfaces, frame relay interfaces, cable interfaces, Digital Subscriber Line (DSL) interfaces, token ring interfaces, and the like. In addition, various very high-speed interfaces may be provided such as fast Ethernet interfaces, Gigabit Ethernet interfaces, Asynchronous Transfer Mode (ATM) interfaces, High Speed Serial (HSS) interfaces, Point of Sale (POS) interfaces, Fiber Distributed Data (FDD) interfaces and the like. Generally, these interfaces may include ports appropriate for communication with the appropriate media. In some cases, they may also include an independent processor and, in some instances, volatile Random Access Memory (RAM). The independent processors may control such communications intensive tasks as packet switching, media control and management.

According to particular example examples, the system 2000 uses memory 2003 to store data and program instructions for operations. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Examples of Aircraft and Methods of Fabricating and Operating Aircraft

Figure 21:
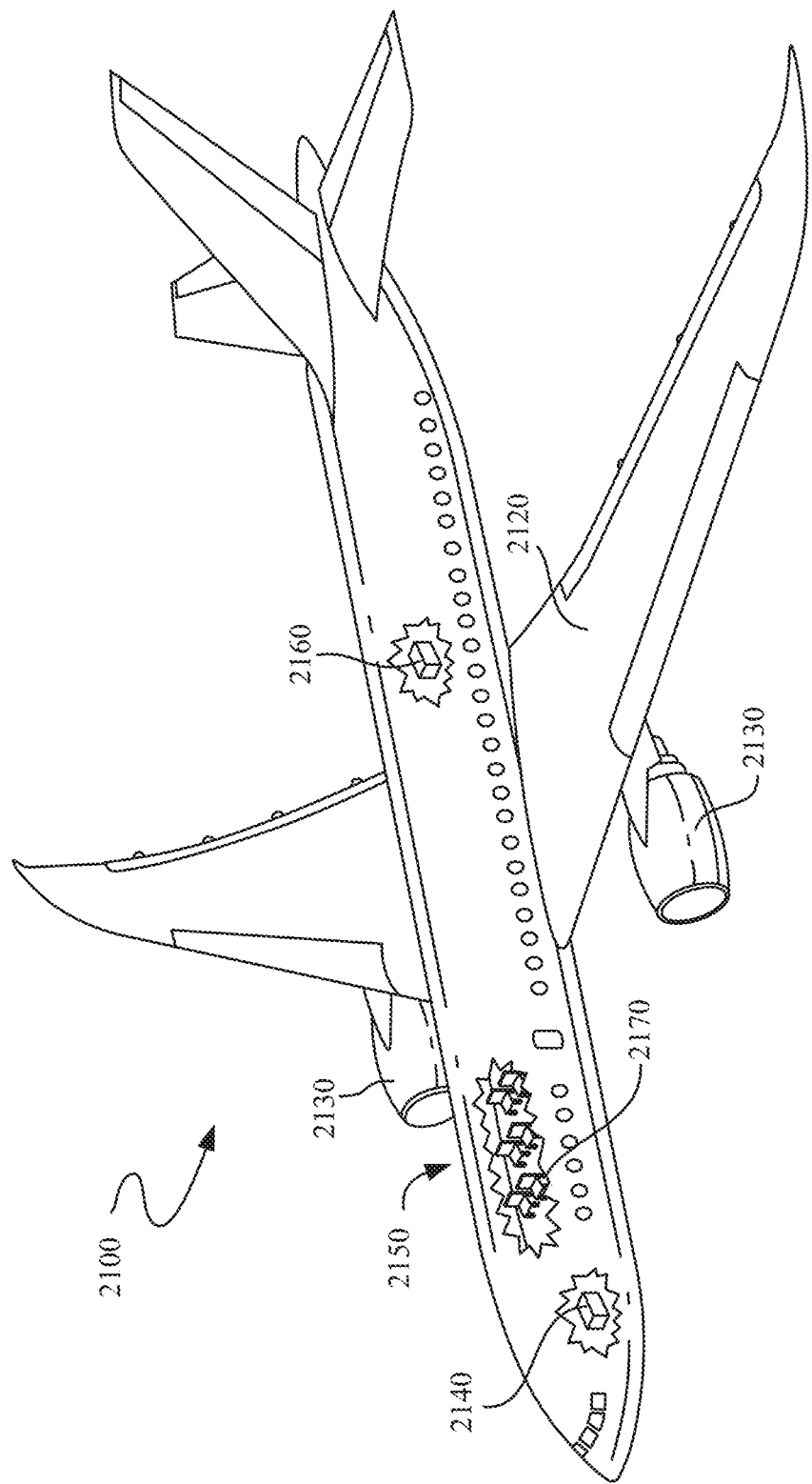
FIG. 21 illustrates a schematic illustration of an aircraft, in accordance with one or more examples of the present disclosure.

To better understand various aspects of implementation of the described systems and techniques, a brief description of an aircraft and aircraft wing is now presented. FIG. 21 is a schematic illustration of aircraft 2100, in accordance with some examples. As depicted in FIG. 21, aircraft 2100 is defined by a longitudinal axis (X-axis), a lateral axis (Y-axis), and a vertical axis (Z-axis). In various examples, aircraft 2100 comprises airframe 2150 with interior 2170. Aircraft 2100 includes wings 2120 coupled to airframe 2150. Aircraft 2100 may also include engines 2130 supported by wings 2120. In some examples, aircraft 2100 further includes a number of high-level inspection systems such as electrical inspection system 2140 and environmental inspection system 2160. In other examples, any number of other inspection systems may be included.

Aircraft 2100 shown in FIG. 21 is one example of a vehicle of which components may be utilized with the disclosed systems and/or devices, in accordance with illustrative examples. Although an aerospace example is shown, the principles disclosed herein may be applied to other industries, such as the automotive industry. Accordingly, in addition to aircraft 2100, the principles disclosed herein may apply to other vehicles, e.g., land vehicles, marine vehicles, space vehicles, etc.

Figure 22:
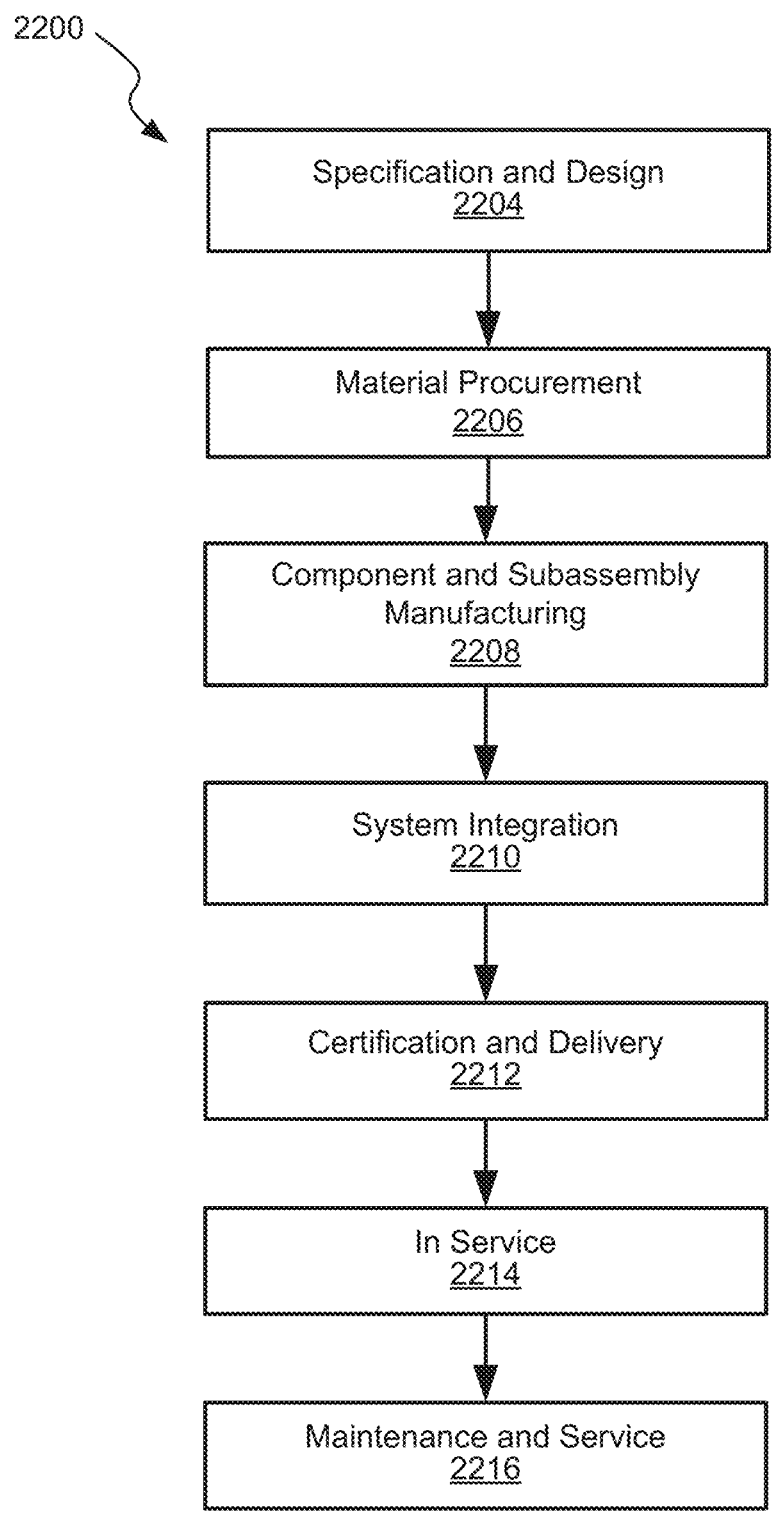
FIG. 22 illustrates an aircraft manufacturing and service method for the aircraft shown in FIG. 21.

Examples of the present disclosure may be described in the context of aircraft manufacturing and service method 2200 as shown in FIG. 22 and aircraft 2100 as shown in FIG. 21. During pre-production, illustrative method 2200 may include specification and design (block 2204) of aircraft 2100 and material procurement (block 2206). During production, component and subassembly manufacturing (block 2208) and inspection system integration (block 2210) of aircraft 2100 may take place. Described methods, and assemblies formed by these methods, can be used in any of specification and design (block 2204) of aircraft 2100, material procurement (block 2206), component and subassembly manufacturing (block 2208), and/or inspection system integration (block 2210) of aircraft 2100.

Thereafter, aircraft 2100 may go through certification and delivery (block 2212) to be placed in service (block 2214). While in service, aircraft 2100 may be scheduled for routine maintenance and service (block 2216). Routine maintenance and service may include modification, reconfiguration, refurbishment, etc. of one or more inspection systems of aircraft 2100. Described methods, and assemblies formed by these methods, can be used in any of certification and delivery (block 2214 service (block 2214), and/or routine maintenance and service (block 2216).

Each of the processes of illustrative method 2200 may be performed or carried out by an inspection system integrator, a third party, and/or an operator (e.g., a customer). For the purposes of this description, an inspection system integrator may include; without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 2200). For example, components or subassemblies corresponding to component and subassembly manufacturing (block 2208) may be fabricated or manufactured in a manner similar to components or subassemblies produced while aircraft 2100 is in service (block 2214). Also, one or more examples of the apparatus(es), method(s), or combination thereof may be utilized during production stages (block 2208) and (block 2210), for example, by substantially expediting assembly of or reducing the cost of aircraft 2100. Similarly, one or more examples of the apparatus or method realizations, or a combination thereof, may be utilized, for example and without limitation, while aircraft 2100 is in service (block 2214) and/or during maintenance and service (block 2216).

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific examples thereof, it will be understood by those skilled in the art that changes in the form and details of the disclosed examples may be made without departing from the spirit or scope of the disclosure. It is therefore intended that the disclosure be interpreted to include all variations and equivalents that fall within the true spirit and scope of the present disclosure.

What is claimed is:

1. A system for automated communication with an aircraft, the system comprising:
   a processor; and
   memory, the memory storing instructions for executing a method, the method comprising:
   receiving audio communication input from an air traffic controller (ATC) comprising a taxi route to take off at a runway, a route to land at a runway, or a change in altitude;
   converting the audio communication input into text input;
   detecting a tail number associated with an aircraft in the text input;
   parsing the text input when the tail number is associated with the aircraft;
   generating one or more data structures from the parsed input, the one or more data structures comprising command data for controlling the aircraft;
   verifying whether the command data in the one or more data structures is valid;
   constructing a response sentence using the one or more data structures;
   transmitting the response sentence to the ATC,
   wherein the response sentence is selected from a confirmation of the taxi route to take off from the runway, confirmation of the route to land at the runway, and confirmation of the change in altitude when the command data is verified as valid; and
   wherein the response sentence is selected from an error message or a request for clarification when the command data is not verified as valid;
   transmitting the one or more data structures to an onboard flight computer of the aircraft when the command data is verified as valid; and
   storing the one or more data structures in a conversation memory.

2. The system of claim 1, wherein generating one or more data structures from the parsed input includes receiving an input text string and creating data type objects from the input text string.

3. The system of claim 1, wherein verifying the command data includes sending data type objects to a validation module.

4. The system of claim 3, wherein the validation module cross-checks command data against one or more of the following: airport data, en route data, aircraft location, and log data.

5. The system of claim 3, wherein the validation module cross-checks command data against one or more of the following: mission specific flight requirements, aircraft limitations, and a global flight database.

6. The system of claim 1, wherein the method further comprises generating a response to the audio communication input using a text-to-speech module.

7. The system of claim 1, wherein the transmitted one or more data structures is used to modify a flight plan or route for automatically controlling flight of the aircraft according to the audio communication input from ATC.

8. A method for automated communication with an aircraft, comprising:
   receiving audio communication input from an air traffic controller (ATC) comprising a taxi route to take off at a runway, a route to land at a runway, or a change in altitude;
   converting the audio communication input into text input;
   detecting a tail number associated with an aircraft in the text input;
   parsing the text input when the tail number is associated with the aircraft;
   generating one or more data structures from the parsed input, the one or more data structures comprising command data for controlling the aircraft;
   verifying whether the command data in the one or more data structures is valid;
   constructing a response sentence using the one or more data structures;
   transmitting the response sentence to the ATC,
   wherein the response sentence is selected from a confirmation of the taxi route to take off from the runway, confirmation of the route to land at the runway, and confirmation of the change in altitude when the command data is verified as valid; and
   wherein the response sentence is selected from an error message or a request for clarification when the command data is not verified as valid;
   transmitting the one or more data structures to an onboard flight computer of the aircraft when the command data is verified as valid; and
   storing the one or more data structures in a conversation memory.

9. The method of claim 8, wherein generating one or more data structures from the parsed input includes receiving an input text string and creating data type objects from the input text string.

10. The method of claim 8, wherein verifying the command data includes sending data type objects to a validation module.

11. The method of claim 10, wherein the validation module cross-checks command data against one or more of the following: airport data, en route data, aircraft location, and log data.

12. The method of claim 10, wherein the validation module cross-checks command data against one or more of the following: mission specific flight requirements, aircraft limitations, and a global flight database.

13. The method of claim 8, wherein the method further comprises generating a response to the audio communication input using a text-to-speech module.

14. The method of claim 8, wherein the one or more data structures is used to modify a flight plan or route for automatically controlling flight of the aircraft according to the audio communication input from ATC.

15. An aircraft, comprising:
a processor; and
memory, the memory storing instructions for executing a method, the method comprising:
receiving audio communication input from an air traffic controller (ATC) comprising a taxi route to take off at a runway, a route to land at a runway, or a change in altitude;
converting the audio communication input into text input;
detecting a tail number associated with an aircraft in the text input;
parsing the text input when the tail number is associated with the aircraft;
generating one or more data structures from the parsed input, the one or more data structures comprising-command data for controlling the aircraft;
verifying whether the command data in the one or more data structures is valid;
constructing a response sentence using the one or more data structures;
transmitting the response sentence to the ATC,
wherein the response sentence is selected from a confirmation of the taxi route to take off from the runway, confirmation of the route to land at the runway, and confirmation of the change in altitude when the command data is verified as valid; and
wherein the response sentence is selected from an error message or a request for clarification when the command data is not verified as valid;
transmitting the one or more data structures to an onboard flight computer of the aircraft when the command data is verified as valid; and
storing the one or more data structures in a conversation memory.

16. The aircraft of claim 15, wherein generating one or more data structures from the parsed input includes receiving an input text string and creating data type objects from the input text string.

17. The aircraft of claim 15, wherein verifying the command data includes sending data type objects to a validation module.

18. The aircraft of claim 17, wherein the validation module cross-checks command data against one or more of the following: airport data, en route data, aircraft location, and log data.

19. The aircraft of claim 17, wherein the validation module cross-checks command data against one or more of the following: mission specific flight requirements, aircraft limitations, and a global flight database.

20. The aircraft of claim 15, wherein the method further comprises generating a response to the audio communication input using a text-to-speech module.

* * * * *